(12) United States Patent
Morikawa et al.

(10) Patent No.: US 12,709,512 B2
(45) Date of Patent: Aug. 18, 2026

(54) MEDIA EJECTING APPARATUS, CONTROL METHOD, AND NON-TRANSITORY COMPUTER-EXECUTABLE MEDIUM

(71) Applicant: PFU LIMITED, Kahoku (JP)

(72) Inventors: Syuichi Morikawa, Kahoku (JP); Kiichiro Shimosaka, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 18/748,352

(22) Filed: Jun. 20, 2024

(65) Prior Publication Data

US 2024/0343522 A1 Oct. 17, 2024

Related U.S. Application Data

(63) Continuation of application No. PCT/JP2022/000044, filed on Jan. 4, 2022.

(51) Int. Cl.
*B65H 7/20* (2006.01)
*B65H 7/08* (2006.01)
(Continued)

(52) U.S. Cl.
CPC .......... *B65H 43/08* (2013.01); *B65H 29/125* (2013.01); *B65H 43/04* (2013.01);
(Continued)

(58) Field of Classification Search
CPC ... B65H 7/20; B65H 7/14; B65H 7/08; B65H 7/10; B65H 9/20; B65H 43/08;
(Continued)

(56) References Cited

U.S. PATENT DOCUMENTS

2005/0169681 A1 8/2005 Hata et al.
2016/0277611 A1 9/2016 Yamazaki
2021/0253387 A1* 8/2021 Funaki .................... B65H 7/06

FOREIGN PATENT DOCUMENTS

JP 2005-247580 A 9/2005
JP 2007-145577 A 6/2007
(Continued)

OTHER PUBLICATIONS

International Search Report dated Mar. 8, 2022 for corresponding PCT Application No. PCT/JP2022/000044 (3 pages) with English Translation (2 pages).

(Continued)

*Primary Examiner* — Luis A Gonzalez
(74) *Attorney, Agent, or Firm* — Womble Bond Dickinson (US) LLP

(57) ABSTRACT

A media ejecting apparatus includes: an imaging device to image a medium to generate an input image, an ejection roller located downstream from the imaging device in a media ejection direction to eject the medium imaged by the imaging device, a sensor located between the imaging device and the ejection roller to detect a part of a trailing end of the medium, and circuitry. The circuitry detects an amount of inclination of the medium. The circuitry determines whether an entire trailing end of the medium has passed an imaging position of the imaging device based on the amount of inclination when a part of the trailing end of the medium passes the sensor and generate a determination result. The circuitry controls the ejection roller based on the determination result.

11 Claims, 13 Drawing Sheets

(51) Int. Cl.
*B65H 29/12* (2006.01)
*B65H 43/04* (2006.01)
*B65H 43/08* (2006.01)
*H04N 1/00* (2006.01)

(52) U.S. Cl.
CPC ..... *H04N 1/00631* (2013.01); *H04N 1/00702* (2013.01); *H04N 1/00774* (2013.01); *B65H 2301/331* (2013.01); *B65H 2511/216* (2013.01); *B65H 2511/24* (2013.01); *B65H 2553/412* (2013.01); *B65H 2601/272* (2013.01); *B65H 2701/1313* (2013.01); *B65H 2801/39* (2013.01)

(58) Field of Classification Search
CPC ...... B65H 43/04; B65H 29/125; B65H 29/20; B65H 2511/24; B65H 2511/214; B65H 2511/216; B65H 2601/272; B65H 2701/1313; H04N 1/00718; H04N 1/00745; H04N 1/00737; H04N 1/00774; H04N 1/00631
See application file for complete search history.

(56) References Cited

FOREIGN PATENT DOCUMENTS

| | | | | | |
|---|---|---|---|---|---|
| JP | 2007-331908 | A | | 12/2007 | |
| JP | 2010-114817 | A | | 5/2010 | |
| JP | 2012206858 | A | * | 10/2012 | ........... B65G 63/004 |
| JP | 2016-174320 | A | | 9/2016 | |
| JP | 2018098527 | A | * | 6/2018 | |
| JP | 2021-197715 | A | | 12/2021 | |

OTHER PUBLICATIONS

Written Opinion dated Mar. 8, 2022 for corresponding PCT Application No. PCT/JP2022/000044 (3 pages) with English Translation (3 pages).
International Preliminary Report on Patentability dated Jun. 20, 2024 for corresponding PCT Application No. PCT/JP2022/000044 (4 pages) with English Translation (4 pages).
Machine Translation of JP2012-206858 A, Published Oct. 25, 2012 (36 pages).

* cited by examiner

FIG. 2

B
WAIT UNTIL PART OF TRAILING END OF MEDIUM PASSES FIFTH MEDIA SENSOR
S201
HAS ENTIRE TRAILING END OF MEDIUM PASSED IMAGING POSITION?
S202
NO
YES
REDUCE EJECTION SPEED
S203
DOES NOT CHANGE EJECTION SPEED
S204
WAIT UNTIL TRAILING END OF MEDIUM PASSES IMAGING POSITION
S205
GENERATE AND OUTPUT MEDIUM IMAGE
S206
IS MEDIUM ON MEDIA TRAY?
S207
A
YES
NO
STOP ROLLERS
S208
END

A1
A2
θ
Y
M2
119a
117
117
112
112
115
116
114
120
121
121
D2
D1
X
L1
L2
P1
P2

MEDIA EJECTING APPARATUS, CONTROL METHOD, AND NON-TRANSITORY COMPUTER-EXECUTABLE MEDIUM

CROSS-REFERENCE TO RELATED APPLICATION

This patent application is a continuation application of International Application No. PCT/JP2022/000044, filed on Jan. 4, 2022, the entire disclosure of which is hereby incorporated by reference herein.

BACKGROUND

The present disclosure relates to a media ejecting apparatus, a control method, and a non-transitory computer-executable medium.

A media ejecting apparatus such as a scanner generates an image by imaging media while successively conveying the media and ejects the media to an ejection tray. In such a media ejecting apparatus, when the media ejected to the ejection tray are not aligned, the user has to align the media. On the other hand, in the media ejecting apparatus, when the ejection speed of media is changed to align the media ejected to the ejection tray, the interval between imaged positions in a medium changes. This may result in distortion in the generated image.

A document reading apparatus that detects the amount of skew of a document by a document detection sensor and controls a relation between a speed at which a conveyance roller pair conveys the document and a speed at which an ejection roller pair conveys the document according to the amount of skew is known.

An image reading apparatus that detects an amount of skew of a document being conveyed in response to detecting that the document reaches a registration sensor and detects an amount of skew of a document being ejected in response to detecting that the document reaches an ejection sensor is known. The image reading apparatus stops the conveyance operation and the ejection when the absolute value of a difference between the two amounts of skew is larger than a threshold value.

SUMMARY

In one aspect, a media ejecting apparatus includes an imaging device to image a medium to generate an input image, an ejection roller located downstream from the imaging device in a media ejection direction to eject the medium imaged by the imaging device, a sensor located between the imaging device and the ejection roller to detect a part of a trailing end of the medium, and circuitry. The circuitry detects an amount of inclination of the medium. The circuitry determines whether an entire trailing end of the medium has passed an imaging position of the imaging device based on the amount of inclination when a part of the trailing end of the medium passes the sensor and generates a determination result. The circuitry controls the ejection roller based on the determination result.

In another aspect, a method of controlling a media ejecting apparatus includes imaging a medium by an imaging device to generate an input image, ejecting the medium imaged by the imaging device by an ejection roller located downstream from the imaging device in a media ejection direction, detecting a part of a trailing end of the medium by a sensor located between the imaging device and the ejection roller, detecting an amount of inclination of the medium, determining whether an entire trailing end of the medium has passed an imaging position of the imaging device based on the amount of inclination when a part of the trailing end of the medium passes the sensor and generating a determination result, and controlling the ejection roller based on the determination result.

In another aspect, a non-transitory computer-executable medium stores a plurality of instructions which, when executed by one or more processors, causes the one or more processors to perform a method. The method includes detecting an amount of inclination of the medium, determining whether an entire trailing end of the medium has passed an imaging position of the imaging device based on the amount of inclination when a part of the trailing end of the medium passes the sensor and generating a determination result, and controlling an ejection roller based on the determination result.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 2 is a diagram illustrating a conveyance passage inside the media ejecting apparatus of FIG. 1;

Figure 1:
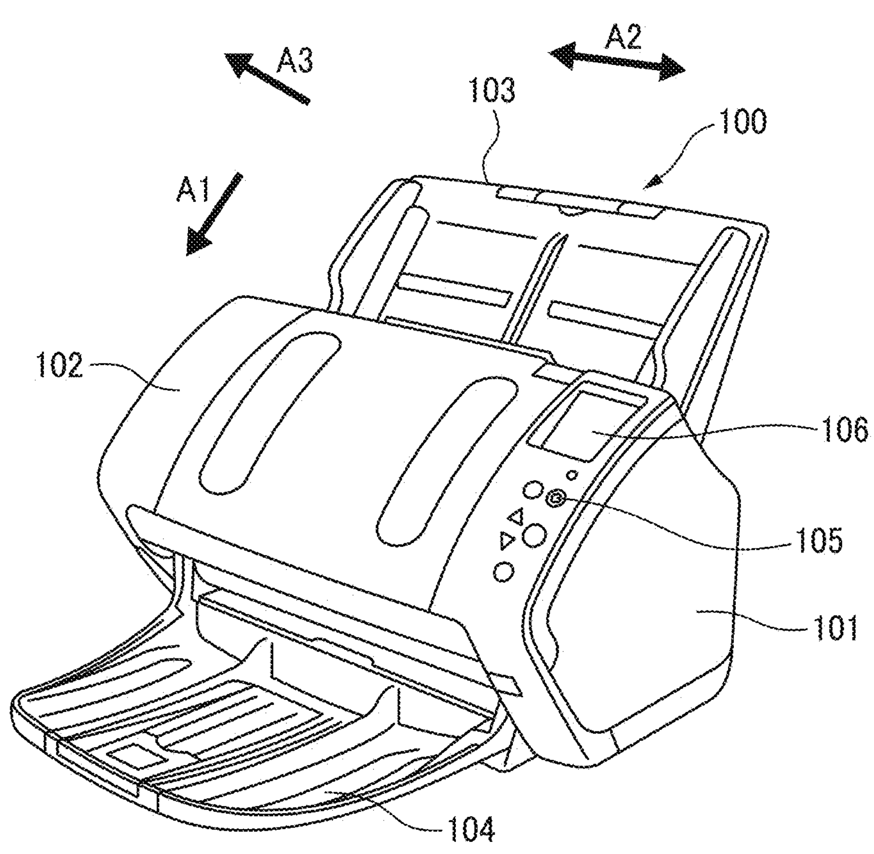
FIG. 1 is a perspective view of a media ejecting apparatus according to an embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

The advantages of the present disclosure are recognized and achieved by the elements particularly pointed out in the appended claims and the combinations thereof. It is to be understood that both the above-described general description and the detailed description described below are exemplary and explanatory only and are not intended to restrict the claimed invention.

A description is given below of a media ejecting apparatus, a control method, and a control program according to an aspect of the present disclosure with reference to the drawings. The technical scope of the present disclosure, however, is not limited to the embodiments described below but includes the scope of the appended claims and the equivalents thereof.

FIG. 1 is a perspective view of a media ejecting apparatus 100 as an image scanner. The media ejecting apparatus 100 conveys, images, and ejects media, which are documents. The media are, for example, sheets of plain paper, sheets of thick paper, cards, booklets, or passports. Alternatively, the media ejecting apparatus 100 may be, for example, a facsimile machine, a copier, or a multifunction peripheral (MFP).

In FIG. 1, arrow A1 indicates the direction in which media are ejected (may be referred to as a “media ejection direction A1” in the following description). Arrow A2 indicates the width direction of the media ejecting apparatus 100 (may be referred to as a “width direction A2” in the following description) orthogonal to the media ejection direction A1. Arrow A3 indicates the height direction orthogonal to a media conveyance passage. In the following description, the term “upstream” refers to upstream in the media ejection direction A1, and the term “downstream” refers to downstream in the media ejection direction A1.

The media ejecting apparatus 100 includes a lower housing 101, an upper housing 102, a media tray 103, an ejection tray 104, an operation device 105, and a display device 106.

The upper housing 102 is disposed at a position covering the upper surface of the media ejecting apparatus 100 and is hinged to the lower housing 101 such that the upper housing 102 can be opened and closed to, for example, remove a jammed medium or clean the inside of the media ejecting apparatus 100.

The media tray 103 is engaged with the lower housing 101. Media to be fed and conveyed are placed on the media tray 103. The ejection tray 104 is engaged with the upper housing 102 and stacks ejected media. The ejection tray 104 may be engaged with the lower housing 101.

The operation device 105 includes an input device such as keys and an interface circuit that acquires signals from the input device. The operation device 105 receives an input operation performed by a user and outputs an operation signal corresponding to the input operation. The display device 106 includes a display and an interface circuit that outputs image data to the display and displays the image data on the display. Examples of the display include, but are not limited to, a liquid crystal and an organic electro-luminescence (EL).

Figure 2:
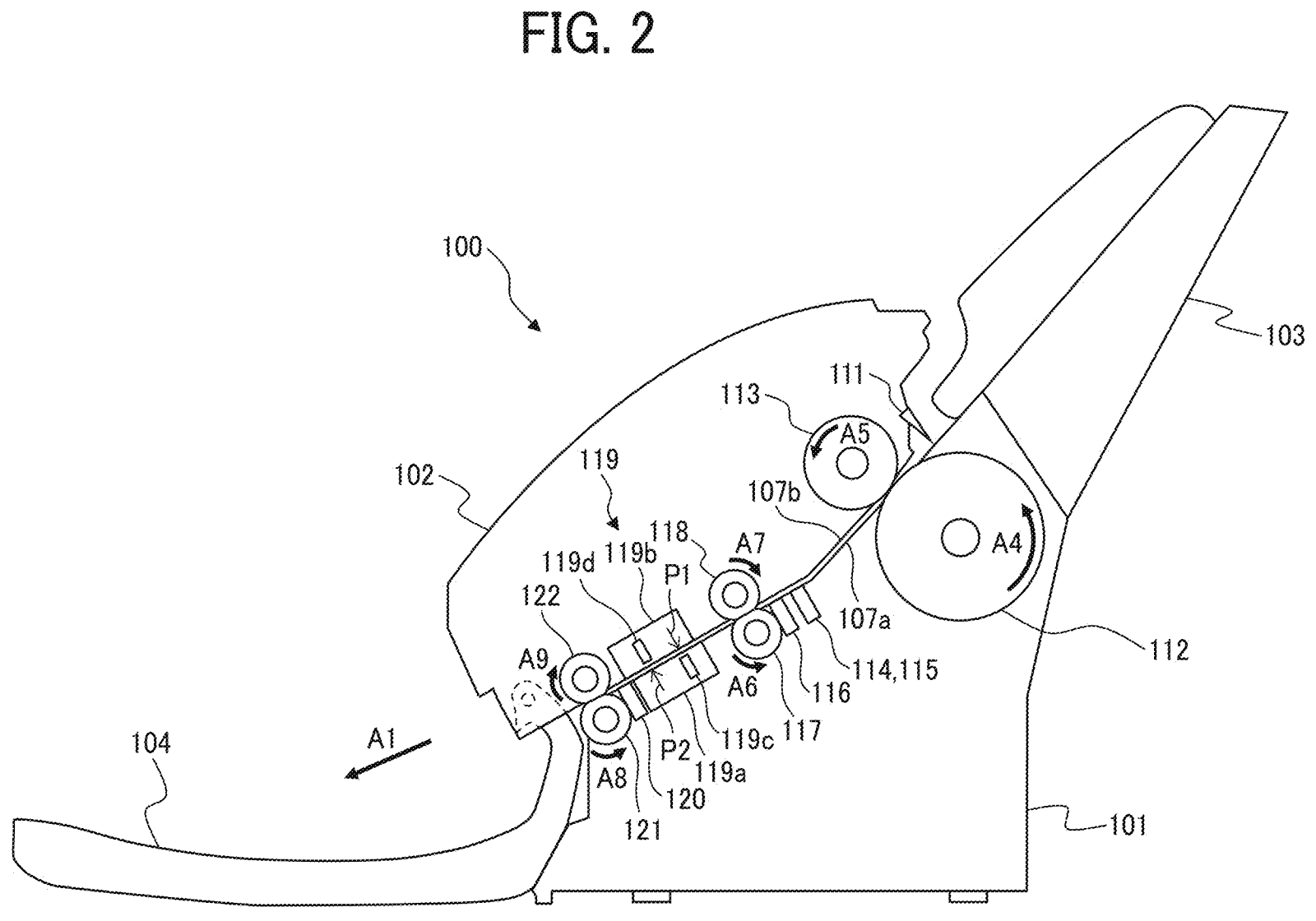

FIG. 2 is a diagram illustrating a conveyance passage inside the media ejecting apparatus 100.

The media ejecting apparatus 100 includes a first media sensor 111, a feed roller 112, a separation roller 113, a second media sensor 114, a third media sensor 115, a fourth media sensor 116, a first conveyance roller 117, a second conveyance roller 118, an imaging device 119, a fifth media sensor 120, a first ejection roller 121, and a second ejection roller 122 along the conveyance passage.

The number of each of the feed roller 112, the separation roller 113, the first conveyance roller 117, the second conveyance roller 118, the first ejection roller 121, and/or the second ejection roller 122 is not limited to one but may be two or more. In this case, the two or more rollers of the feed rollers 112, the separation rollers 113, the first conveyance rollers 117, the second conveyance rollers 118, the first ejection rollers 121, and/or the second ejection rollers 122 are aligned and spaced apart in the width direction A2 orthogonal to the media ejection direction A1.

The upper face of the lower housing 101 forms a lower guide 107*a* for the media conveyance passage. The lower face of the upper housing 102 forms an upper guide 107*b* for the media conveyance passage. As illustrated in FIG. 2, the media conveyance passage has a so-called straight path in which the front side and the back side of a medium does not change before feeding and after ejecting. As the media conveyance passage has the straight path, the media ejecting apparatus 100 is formed compactly.

The first media sensor 111 is disposed upstream from the feed roller 112 and the separation roller 113. The first media sensor 111 includes a contact detection sensor and detects whether a medium is placed on the media tray 103. The first media sensor 111 generates a first media signal of which the signal value changes depending on whether a medium is placed on the media tray 103 and outputs the generated first media signal. The first media sensor 111 is not limited to the contact sensor. The first media sensor 111 may be any other sensor that can detect the presence of a medium such as an optical sensor.

The feed roller 112 is disposed in the lower housing 101 and feeds the media on the media tray 103 from the bottom. The separation roller 113 is disposed to face the feed roller 112 in the upper housing 102. Alternatively, the feed roller 112 may be disposed in the upper housing 102 and the separation roller 113 may be disposed in the lower housing 101 such that the feed roller 112 feeds the media on the media tray 103 from the top.

The first conveyance roller 117 and the second conveyance roller 118 are disposed downstream from the feed roller 112 to face each other. The first conveyance roller 117 and the second conveyance roller 118 convey the media fed by the feed roller 112 and the separation roller 113 to the imaging device 119.

The imaging device 119 is an example of an imaging device. The imaging device 119 includes a first imaging device 119*a* and a second imaging device 119*b* facing each other across the media conveyance passage.

The first imaging device 119*a* includes a first imaging sensor 119*c* configured by a contact image sensor (CIS) employing an equal-magnification optical system and including, as imaging elements, complementary metal oxide semiconductors (CMOSs) aligned linearly in the main-scanning direction. The first imaging sensor 119*c* images the front side of a medium at a first imaging position P1. The first imaging position P1 is an example of a first position. The front side of the medium is an example of a first side. The first imaging device 119*a* further includes a lens that forms an image on the imaging elements and an analog-to-digital (A/D) converter that amplifies the electrical signals output from the imaging elements and performs analog-to-digital (A/D) conversion. The first imaging device 119*a* images the areas facing the first imaging sensor 119*c* on the front sides of media being conveyed at regular intervals to successively generate input images and output the input images. In other words, the number of pixels in the vertical direction (sub-scanning direction) of the input image is one, and the number of pixels in the horizontal direction (main scanning direction) is multiple.

Similarly, the second imaging device 119*b* includes a second imaging sensor 119*d* configured by a CIS employing the equal-magnification optical system and including, as imaging elements, CMOSs aligned linearly in the main-scanning direction. The second imaging sensor 119*d* images the back side of a medium at a second imaging position P2, which is a position downstream from the first imaging position P1 in the media ejection direction A1. The second imaging position P2 is an example of a second position. The back side of the medium is an example of a second side. The second imaging position P2 downstream from the first imaging position P1 is an example of an imaging position by the imaging device 119. The second imaging device 119*b* further includes a lens that forms an image on the imaging elements and an A/D converter that amplifies the electrical signals output from the imaging elements and performs A/D conversion. The second imaging device 119*b* images, the areas facing the second imaging sensor 119*d* on the back sides of media being conveyed at regular intervals to successively generate input images and output the input images.

Alternatively, the media ejecting apparatus 100 may include either the first imaging device 119*a* or the second imaging device 119*b* to read only one side of the medium. A line sensor configured by a CIS employing a unity magnification optical system including an imaging element including a charge-coupled device (CCD) may be used as the first imaging sensor 119*c* and/or the second imaging sensor 119*d*. Alternatively, a line sensor employing a reduction optical system and including a CMOS or CCD imaging element may be used as the first imaging sensor 119*c* and/or the second imaging sensor 119*d*. The first imaging sensor 119*c* and the second imaging sensor 119*d* may be disposed in a manner that the second imaging sensor 119*d* images the back side of the medium at the first imaging position P1 and the first imaging sensor 119*c* images the front side of the medium at the second imaging position P2 downstream from the first imaging position P1. In this case, the back side of the medium is an example of the first side, and the front side of the medium is an example of the second side. The first ejection roller 121 and the second ejection roller 122 are disposed downstream from the imaging device 119 in the media ejection direction A1 to face each other. The first ejection roller 121 and the second ejection roller 122 eject the medium that is conveyed by the first conveyance roller 117 and the second conveyance roller 118 and is imaged by the imaging device 119 to the ejection tray 104. The first ejection roller 121 and/or the second ejection roller 122 are examples of ejection rollers. In the following description, the first ejection roller 121 and/or the second ejection roller 122 may be collectively referred to as an "ejection roller."

As the feed roller 112 rotates in the direction indicated by Arrow A4 of FIG. 2, that is, in the media feeding direction, the medium is conveyed from the media tray 103 in the media ejection direction A1 between the lower guide 107*a* and the upper guide 107*b*. The separation roller 113 rotates in the direction indicated by Arrow A5 opposite to the media feeding direction when conveying the medium. Due to the action of the feed roller 112 and the separation roller 113, when a plurality of media is placed on the media tray 103, only the medium in contact with the feed roller 112 among the media placed on the media tray 103 is separated. This prevents the feeding of a medium other than the separated medium. In other words, the multiple feeding is prevented.

The medium is fed between the first conveyance roller 117 and the second conveyance roller 118 while being guided by the lower guide 107*a* and the upper guide 107*b*. As the first conveyance roller 117 rotates in the direction of Arrow A6 and the second conveyance roller 118 rotates in the direction of Arrow A7, the medium is fed between the first imaging device 119*a* and the second imaging device 119*b*. As the first ejection roller 121 rotates in the direction of Arrow A8 and the second ejection roller 122 rotates in the direction of Arrow A9, the medium read by the imaging device 119 is ejected to the ejection tray 104. The ejection tray 104 stacks the medium ejected by the first ejection roller 121 and the second ejection roller 122.

Figure 3:
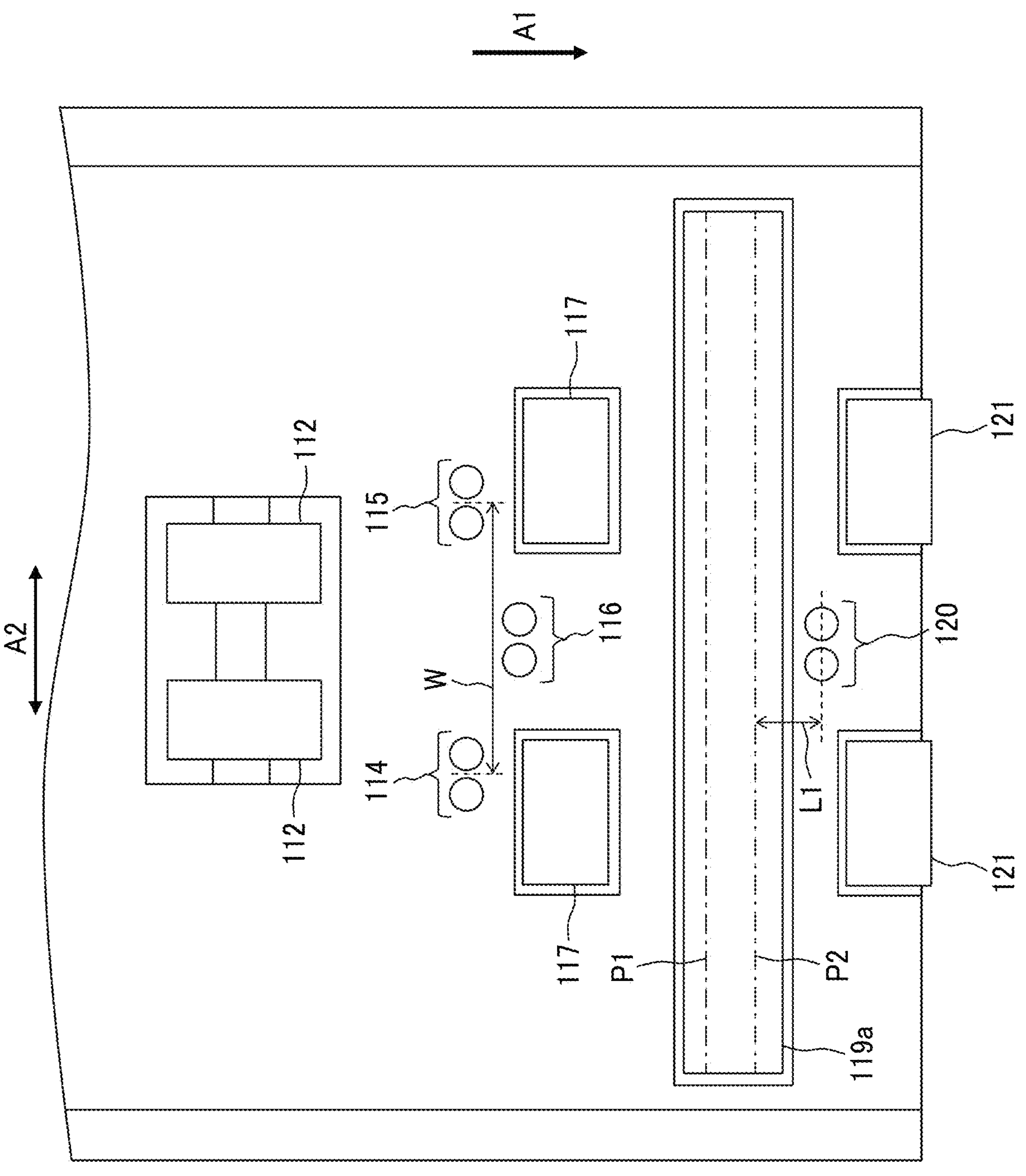
FIG. 3 is a schematic diagram for describing the arrangement positions of media sensors of the media ejecting apparatus of FIG. 1.

FIG. 3 is a schematic diagram for describing the arrangement positions of the rollers and the media sensors. FIG. 3 is a schematic view of the lower housing 101 in the open state as viewed from the conveyance passage.

In the example illustrated in FIG. 3, two feed rollers 112, two separation rollers 113, two first conveyance rollers 117, two second conveyance rollers 118, two first ejection rollers 121, and two second ejection rollers 122 are disposed.

The second media sensor 114 and the third media sensor 115 are an example of a plurality of another sensors. The second media sensor 114 and the third media sensor 115 are disposed downstream from the feed rollers 112 and the separation rollers 113 and upstream from the imaging device 119 in the media ejection direction A1, and are aligned and spaced apart in the width direction A2 orthogonal to the media ejection direction. The second media sensor 114 and the third media sensor 115 are disposed such that a distance W between the second media sensor 114 and the third media sensor 115 in the width direction A2 is less than the minimum width of a medium that the media ejecting apparatus 100 supports. In the example illustrated in FIG. 3, the second media sensor 114 and the third media sensor 115 are disposed upstream from the first conveyance rollers 117 and the second conveyance rollers 118. Alternatively, the second media sensor 114 and the third media sensor 115 may be disposed downstream from the first conveyance rollers 117 and the second conveyance rollers 118. The second media sensor 114 and the third media sensor 115 detect the leading end and the trailing end of the medium conveyed to the positions of the second media sensor 114 and third media sensor 115.

The second media sensor 114 includes a light emitter, a light receiver, and a light guide member. The light emitter and the light receiver are disposed on one side of the media conveyance passage. The light guide member faces the light emitter and the light receiver across the media conveyance passage. The light guide member is a light guide such as a U-shaped prism. The light emitter is, for example, a light-emitting diode (LED) and emits light toward the medium conveyance passage. By contrast, the light receiver is, for example, a photodiode and receives light that is emitted by the light emitter and guided by the light guide member. When the medium is present at a position opposite to the second media sensor 114, the light emitted from the light emitter is blocked by the medium, and therefore the light receiver does not detect the light emitted from the light emitter. Based on the intensity of the light received, the light receiver generates and outputs a second media signal of which the signal value changes between when a medium is present at the position of the second media sensor 114 and when a medium is absent at the position of the second media sensor 114. The second media signal is an example of an output signal from the second media sensor 114.

Similarly, the third media sensor 115 includes a light emitter, a light receiver, and a light guide member. The light emitter and the light receiver are disposed on one side of the media conveyance passage. The light guide member faces the light emitter and the light receiver across the media conveyance passage. The light guide member is a light guide such as a U-shaped prism. The light emitter is, for example, an LED and emits light toward the conveyance passage. By contrast, the light receiver is, for example, a photodiode and receives light that is emitted by the light emitter and guided by the light guide member. Based on the intensity of the light received, the light receiver generates and outputs a third media signal of which the signal value changes between when a medium is present at the position of the third media sensor 115 and when a medium is absent at the position of the third media sensor 115. The third media signal is an example of an output signal from the third media sensor 115.

The fourth media sensor 116 is disposed downstream from the feed rollers 112 and the separation rollers 113 and upstream from the imaging device 119 in the media ejection direction A1. The fourth media sensor 116 is disposed at the center in the width direction A2 orthogonal to the media ejection direction, particularly between the two first conveyance rollers 117 and between the two second conveyance rollers 118. In the example illustrated in FIG. 3, the fourth media sensor 116 is disposed downstream from the second media sensor 114 and the third media sensor 115 and upstream from the first conveyance rollers 117 and the second conveyance rollers 118. Alternatively, the fourth media sensor 116 may be disposed in the same position as the second media sensor 114 and the third media sensor 115 in the media ejection direction A1 or upstream from the second media sensor 114 and the third media sensor 115 in the media ejection direction A1. Still alternatively, the fourth media sensor 116 may be disposed downstream from the first conveyance rollers 117 and the second conveyance rollers 118. The fourth media sensor 116 detects the leading end and the trailing end of the medium conveyed to the position of the fourth media sensor 116.

The fourth media sensor 116 includes a light emitter, a light receiver, and a light guide member. The light emitter and the light receiver are disposed on one side of the media conveyance passage. The light guide member faces the light emitter and the light receiver across the media conveyance passage. The light guide member is a light guide such as a U-shaped prism. The light emitter is, for example, an LED and emits light toward the conveyance passage. By contrast, the light receiver is, for example, a photodiode and receives light that is emitted by the light emitter and guided by the light guide member. Based on the intensity of the light received, the light receiver generates and outputs a fourth media signal of which the signal value changes between when a medium is present at the position of the fourth media sensor 116 and when a medium is absent at the position of the fourth media sensor 116.

The fifth media sensor 120 is an example of a sensor. The fifth media sensor 120 is disposed between the imaging device 119 and the first ejection rollers 121 and the second ejection rollers 122. In other words, the fifth media sensor 120 is disposed downstream from the imaging device 119 and upstream from the first ejection rollers 121 and the second ejection rollers 122 in the media ejection direction A1. The fifth media sensor 120 is disposed at the center in the width direction A2 orthogonal to the media ejection direction, particularly between the two first ejection rollers 121 and between the two second ejection rollers 122. The fifth media sensor 120 detects the leading end and the trailing end of the medium conveyed to the position of the fifth media sensor 120.

The fifth media sensor 120 includes a light emitter, a light receiver, and a light guide member. The light emitter and the light receiver are disposed on one side of the media conveyance passage. The light guide member faces the light emitter and the light receiver across the media conveyance passage. The light guide member is a light guide such as a U-shaped prism. The light emitter is, for example, an LED and emits light toward the conveyance passage. By contrast, the light receiver is, for example, a photodiode and receives light that is emitted by the light emitter and guided by the light guide member. Based on the intensity of the light received, the light receiver generates and outputs a fifth media signal of which the signal value changes between when a medium is present at the position of the fifth media sensor 120 and when a medium is absent at the position of the fifth media sensor 120.

In the second media sensor 114, the third media sensor 115, the fourth media sensor 116, and/or the fifth media sensor 120, a reflector such as a mirror may be used instead of the light guide member. In the second media sensor 114, the third media sensor 115, the fourth media sensor 116, and/or the fifth media sensor 120, the light emitter and the light receiver may face each other across the conveyance passage. Further, the second media sensor 114, the third media sensor 115, the fourth media sensor 116, and/or the fifth media sensor 120 may detect the presence of the medium with, for example, a contact sensor that causes a predetermined current to flow when a medium is in contact with the contact sensor or when no medium is in contact with the contact sensor.

Figure 4:
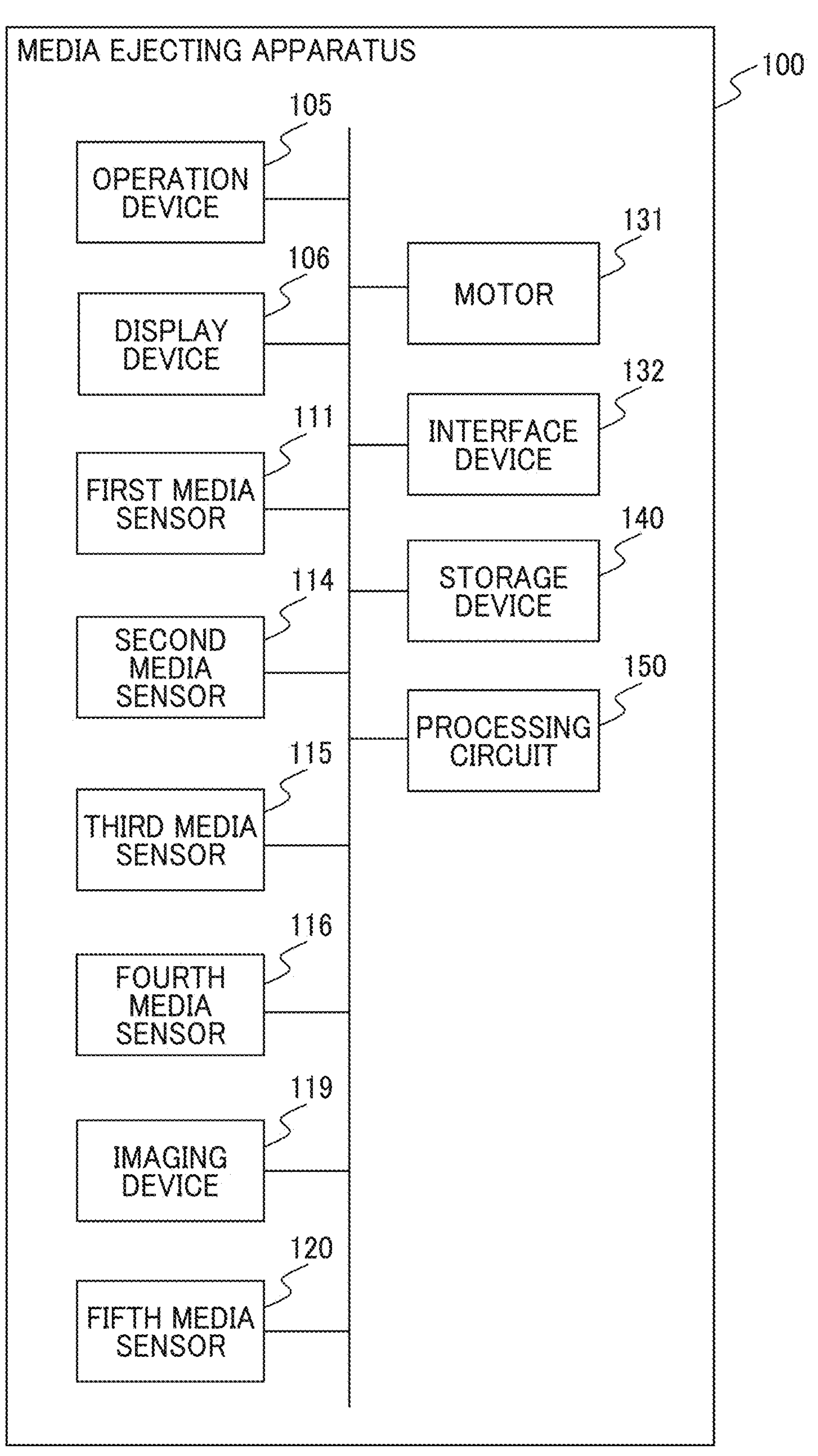
FIG. 4 is a block diagram schematically illustrating a configuration of the media ejecting apparatus of FIG. 1.

FIG. 4 is a block diagram schematically illustrating a configuration of the media ejecting apparatus 100.

The media ejecting apparatus 100 further includes a motor 131, an interface device 132, a storage device 140, and a processing circuit 150, in addition to the configuration described above.

The motor 131 includes one or a plurality of motors. The motor 131 rotates the feed roller 112, the separation roller 113, the first conveyance roller 117, the second conveyance roller 118, the first ejection roller 121, and the second ejection roller 122 according to a control signal from the processing circuit 150 to convey a medium. One of the first conveyance roller 117 and the second conveyance roller 118 may be a driven roller rotated by the rotation of the other roller. Further, one of the first ejection roller 121 and the second ejection roller 122 may be a driven roller rotated by the rotation of the other roller.

The interface device 132 includes an interface circuit compatible with a serial bus such as a universal serial bus (USB) and is electrically connected to an information processing apparatus (e.g., a personal computer or a mobile information processing terminal) to transmit and receive an input image and various kinds of information to and from the information processing apparatus. The interface device 132 may be substituted by a communication unit including an antenna to transmit and receive wireless signals and a wireless communication interface device to transmit and receive the signals through a wireless communication line according to a predetermined communication protocol. The predetermined communication protocol is, for example, a wireless local area network (LAN) communication protocol.

The communication unit may include a wired communication interface device to transmit and receive signals through a wired communication line according to, for example, a wired LAN communication protocol.

The storage device 140 includes memories such as a random-access memory (RAM) and a read-only memory (ROM), a fixed disk device such as a hard disk, or a portable memory such as a flexible disk or an optical disc. The storage device 140 stores, for example, computer programs, databases, and tables used for various processes performed by the media ejecting apparatus 100. The computer programs may be installed in the storage device 140 from a computer-readable portable recording medium using, for example, a known setup program. The portable recording medium is, for example, a compact disc read-only memory (CD-ROM) or a digital versatile disc read-only memory (DVD-ROM).

The processing circuit 150 operates according to a program prestored in the storage device 140. The processing circuit 150 is, for example, a central processing unit (CPU). Alternatively, a digital signal processor (DSP), a large-scale integration (LSI), an application-specific integrated circuit (ASIC), or a field-programmable gate array (FPGA) may be used as the processing circuit 150.

The processing circuit 150 is connected to the operation device 105, the display device 106, the first media sensor 111, the second media sensor 114, the third media sensor 115, the fourth media sensor 116, the imaging device 119, the fifth media sensor 120, the motor 131, the interface device 132, and the storage device 140, and controls these components. The processing circuit 150 controls, for example, the driving of the motor 131 and the imaging by the imaging device 119. The processing circuit 150 acquires an input image from the imaging device 119 to generate a medium image and transmits the medium image to the information processing apparatus via the interface device 132. Further, the processing circuit 150 detects an amount of inclination of a medium based on the input image. When a part of the trailing end of the medium passes the position of the fifth media sensor 120, the processing circuit 150 determines whether the entire trailing end of the medium has passed the imaging position of the imaging device 119 based on the detected amount of inclination. The processing circuit 150 controls the first ejection roller 121 and/or the second ejection roller 122 based on the determination result.

Figure 5:
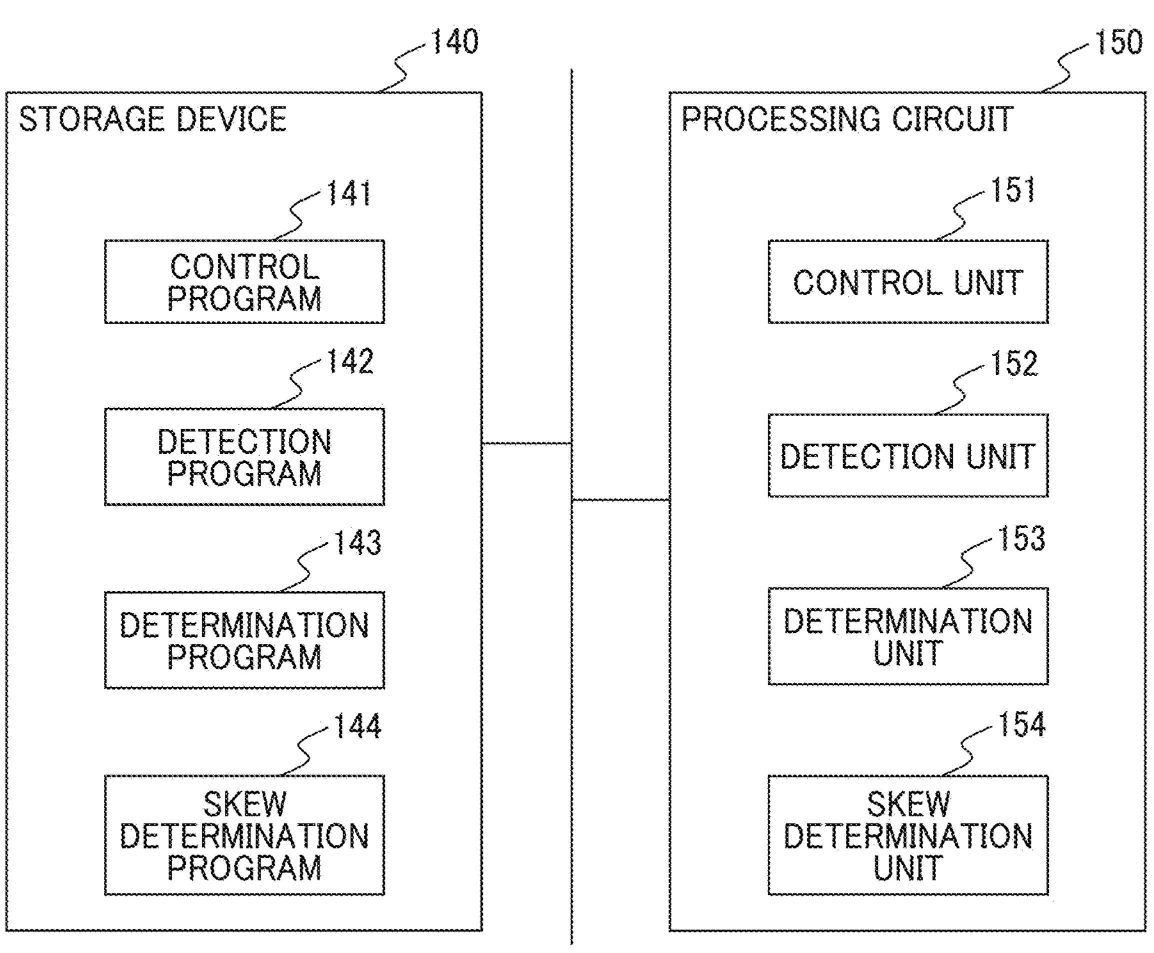
FIG. 5 is a block diagram schematically illustrating a configuration of a storage device and a processing circuit illustrated in FIG. 4.

FIG. 5 is a block diagram schematically illustrating a configuration of the storage device 140 and the processing circuit 150.

As illustrated in FIG. 5, the storage device 140 stores programs such as a control program 141, a detection program 142, a determination program 143, and a skew determination program 144. These programs are functional modules implemented by software operating on a processor. The processing circuit 150 reads the programs from the storage device 140 and operates according to the read programs. Thus, the processing circuit 150 functions as a control unit 151, a detection unit 152, a determination unit 153, and a skew determination unit 154.

Figure 6:
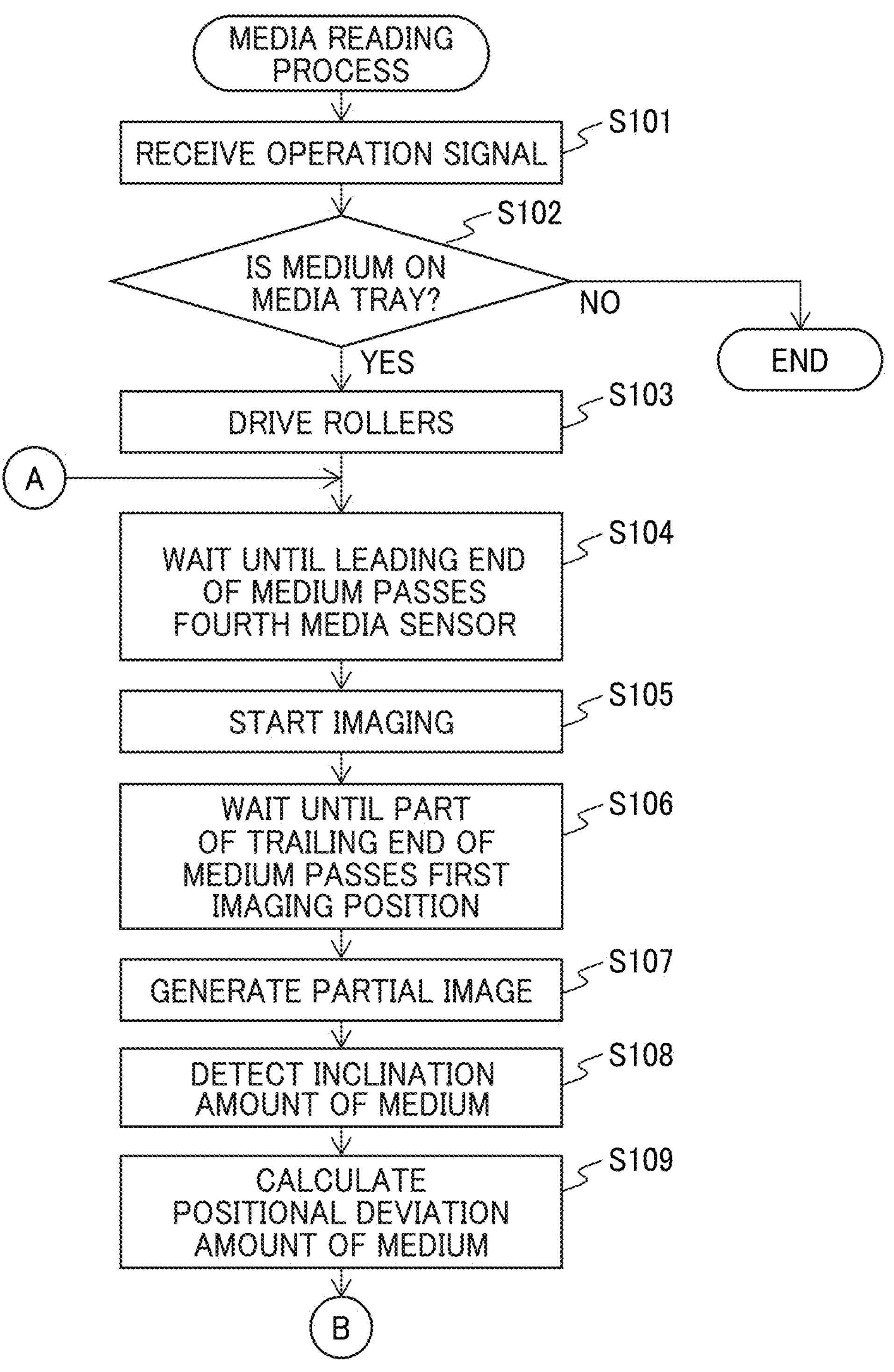
FIG. 6 is a flowchart illustrating an example of a media reading process.
Figure 7:
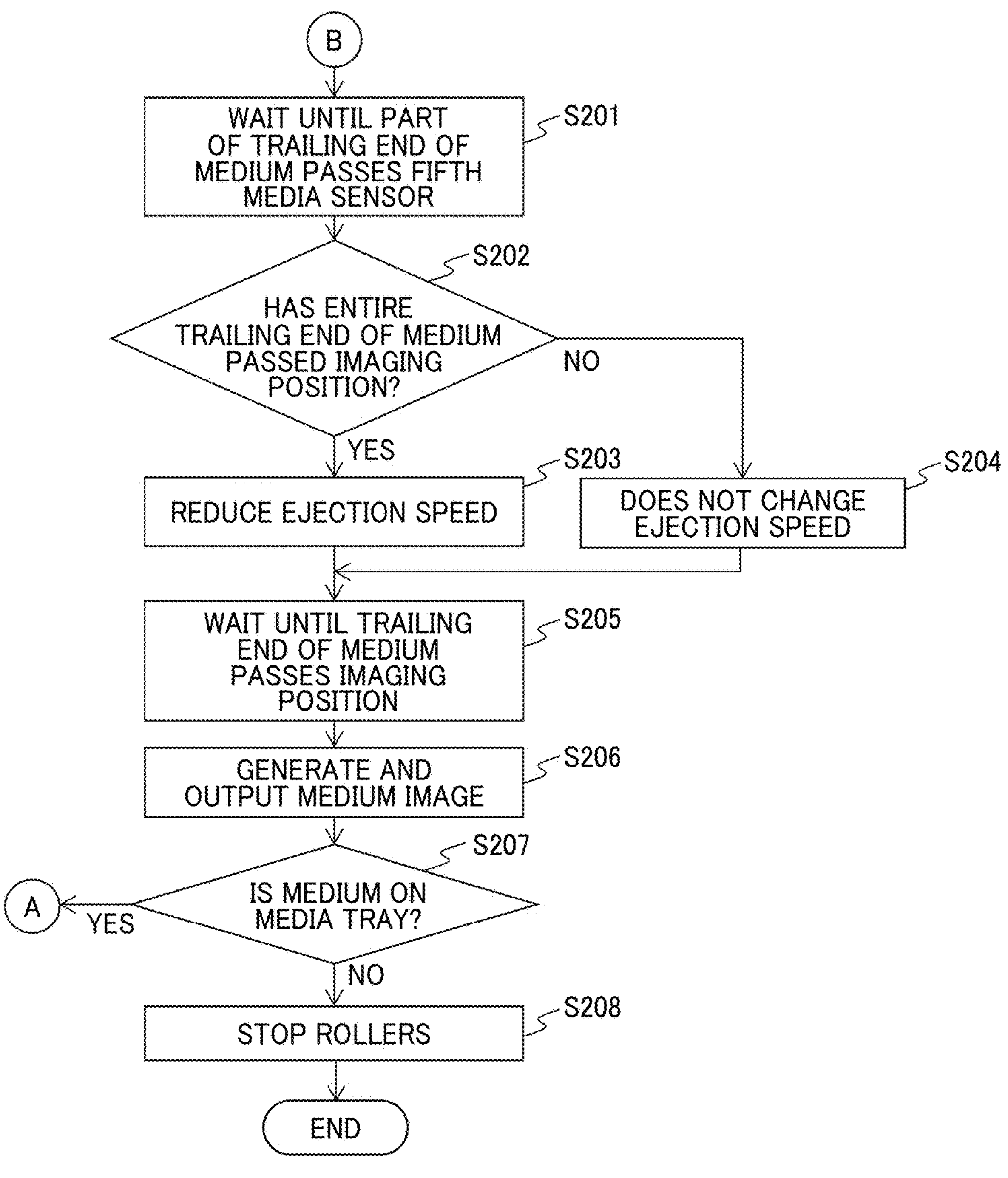
FIG. 7 is another flowchart illustrating an example of the media reading process.

FIG. 6 is a flowchart of a media reading process performed by the media ejecting apparatus 100. FIG. 7 is a continuation of the flowchart of FIG. 6.

A description is given below of the media reading process performed by the media ejecting apparatus 100, with reference to the flowchart of FIG. 6 and FIG. 7. The operation process described below is executed, for example, by the processing circuit 150 in cooperation with the components of the media ejecting apparatus 100 according to the programs prestored in the storage device 140.

The control unit 151 waits until the control unit 151 receives an operation signal instructing the reading of media from the operation device 105 or the interface device 132 (step S101). The operation signal is output when the user inputs an instruction to read media using the operation device 105 or the information processing apparatus.

Subsequently, the control unit 151 acquires the first media signal from the first media sensor 111 and determines whether a medium is placed on the media tray 103 based on the acquired first media signal (step S102). When no medium is present on the media tray 103 (NO in step S102), the control unit 151 ends the series of steps.

By contrast, when a medium is present on the media tray 103 (YES in step S102), the control unit 151 drives the motor 131. The control unit 151 controls the feed roller 112, the separation roller 113, the first conveyance roller 117, the second conveyance roller 118, the first ejection roller 121, and/or the second ejection roller 122 to rotate to convey a medium (step S103).

Subsequently, the control unit 151 waits until the leading end of the conveyed medium passes the position of the fourth media sensor 116 (step S104). The control unit 151 periodically acquires the fourth media signal from the fourth media sensor 116 and determines that the leading end of the medium has passed the position of the fourth media sensor 116 when the signal value of the fourth media signal changes from a value indicating the absence of a medium to a value indicating the presence of a medium.

When the leading end of the conveyed medium has passed the position of the fourth media sensor 116, the control unit 151 controls the imaging device 119 to start imaging the medium (step S105). Thereafter, the control unit 151 acquires an input image from the imaging device 119 at regular intervals (every time the imaging device 119 generates an input image), and stores the input image in the storage device 140.

Subsequently, the control unit 151 waits until a part of the trailing end of the conveyed medium passes the first imaging position P1 of the first imaging sensor 119*c* disposed upstream from the second imaging sensor 119*d* (step S106). The control unit 151 periodically acquires the fourth media signal from the fourth media sensor 116 and determines that the trailing end of the medium has passed the position of the fourth media sensor 116 when the signal value of the fourth media signal changes from a value indicating the presence of a medium to a value indicating the absence of a medium. The control unit 151 determines that a part of the trailing end of the medium has passed the first imaging position P1 when a first predetermined time has elapsed since the trailing end of the medium passed the position of the fourth media sensor 116. The first predetermined time is set to a time obtained by adding or subtracting a margin to or from a time taken for media to move from the position of the fourth media sensor 116 to the first imaging position P1. Alternatively, the control unit 151 may determine that a part of the trailing end of the medium has passed the first imaging position P1 after the elapse of a predetermined time from the start of the feeding of the medium.

When a part of the trailing end of the media has passed the first imaging position P1, the control unit 151 generates a partial image by combining input images acquired from the first imaging device 119*a* up to the current time (step S107).

Figure 8:
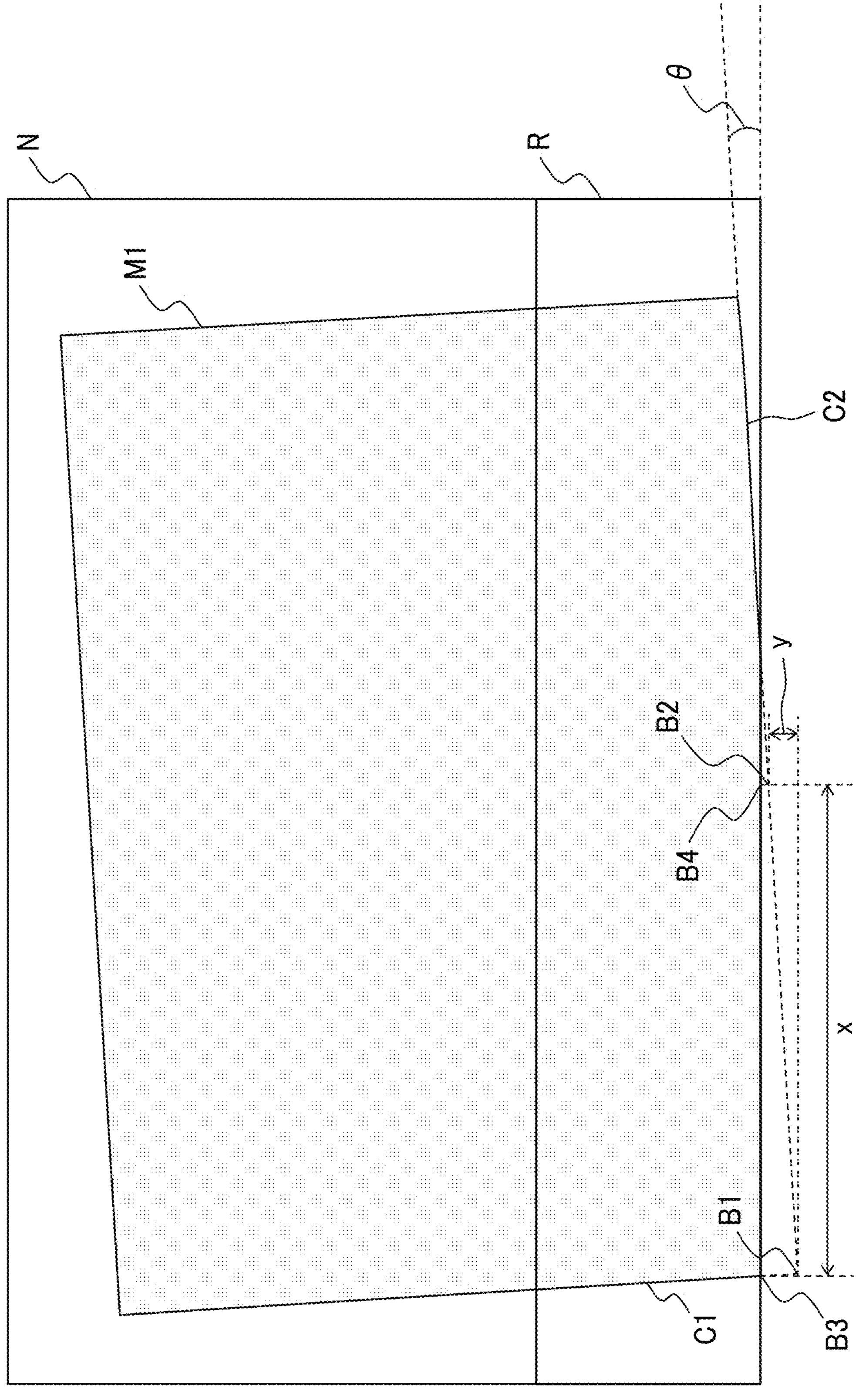
FIG. 8 is a schematic diagram illustrating an example of a partial image.

FIG. 8 is a schematic diagram illustrating an example of a partial image N.

The partial image N illustrated in FIG. 8 includes a medium M1 that are conveyed as being inclined. Since the medium M1 is inclined, a part of the trailing end of the medium M1 is not included in the partial image N. Since the partial image N is used to calculate an inclination angle (an amount of inclination) θ of the medium M1, the partial image N does not have to include the entire trailing end of the medium M1. The control unit 151 generates the partial image N at the time when only a part of the trailing end of the medium M1 is included. Accordingly, the media ejecting apparatus 100 can detect the amount of inclination θ of a medium at an early stage.

Subsequently, the detection unit 152 detects the amount of inclination θ based on the partial image N (step S108). In other words, the detection unit 152 detects the amount of inclination θ based on the input image imaged by the first imaging sensor 119*c* of which the imaging position is upstream from the imaging position of the second imaging sensor 119*d*. Accordingly, the detection unit 152 can detect the amount of inclination of the medium at an earlier stage.

The detection unit 152 first calculates, for each pixel within a predetermined range R from the trailing end of the partial image, an absolute value of the difference in gradation values between two vertically adjacent pixels (hereinafter, referred to as an "adjacent difference value") along each vertical line while moving vertically (sub-scanning direction) from the trailing end of the partial image. The predetermined range R is set to a range (e.g., a range within 1000 pixels) in which the trailing end of a medium is reliably included. The detection unit 152 detects a pixel of which the adjacent difference value exceeds a gradation threshold value in each of the vertical lines as an edge pixel. The gradation value is, for example, a brightness value or a color value such as an R value, a G value, or a B value. The gradation threshold value is set to, for example, a difference in the brightness value (e.g., 20) at which a person can visually distinguish a difference in brightness on an image. The detection unit 152 detects an edge pixel at the most trailing end side in each vertical line as a trailing edge pixel.

Alternatively, the detection unit 152 may calculate an absolute value of the difference between the gradation values of two pixels that are apart from each pixel by a predetermined distance in the horizontal or vertical direction as the adjacent difference value. Alternatively, the detection unit 152 may detect the edge pixel by comparing the gradation value of each pixel with a threshold value. For example, when the gradation value of a particular pixel is less than a threshold value and the gradation value of a pixel adjacent to the particular pixel in the horizontal or vertical direction or a pixel apart from the particular pixel by a predetermined distance is equal to or greater than the threshold value, the detection unit 152 detects the particular pixel as the edge pixel.

Subsequently, the detection unit 152 detects a straight line (line segment) based on the trailing edge pixels as the trailing edge of the medium using the least squares method. Alternatively, the detection unit 152 may detect the straight line using the Hough transform. Further, when multiple straight lines are detected based on the trailing edge pixels, the detection unit 152 may detect a straight line having the largest length in the horizontal direction (main scanning direction) as the trailing edge of the medium. In the example illustrated in FIG. 8, a straight line C1 and a straight line C2 are detected based on the trailing edge pixels, and the straight line C2 which is longer in the horizontal direction (main scanning direction) is detected as the trailing end of the media. The detection unit 152 detects an angle θ formed by the detected straight line (the trailing end of the medium) and the horizontal direction as the amount of inclination of the medium.

Subsequently, the detection unit 152 estimates an amount of positional deviation in the media ejection direction A1 between an end position B1 on the lagging side on the trailing end of the medium and a position B2 facing the fifth media sensor 120 on the trailing end (step S109).

The detection unit 152 identifies an end on the lagging side from the left end and the right end on the trailing end of the medium based on the inclination of the trailing end of the medium. In the same or substantially the same manner as step S109, the detection unit 152 detects an end edge pixel B3 in the partial image corresponding to the identified end on the lagging side on the most trailing end of the partial image N. The detection unit 152 calculates the adjacent difference values from the identified lagging end side on the most trailing end of the partial image N, and detects a pixel of which the adjacent difference value exceeds the gradation threshold value for the first time as the end edge pixel B3.

The detection unit 152 calculates a horizontal distance x between the detected end edge pixel B3 and a pixel B4 corresponding to the position of the fifth media sensor 120 on the trailing end of the partial image N. The position of the pixel B4 corresponding to the fifth media sensor 120 in the horizontal direction on the trailing end of the partial image N is set in advance based on the positional relationship between the first imaging position P1 of the first imaging sensor 119*c* and the position of the fifth media sensor 120. Subsequently, the detection unit 152 calculates (estimates) an amount of positional deviation y in the vertical direction on the partial image between the end position B1 on the lagging side on the trailing end of the medium and the position B2 facing the fifth media sensor 120 based on the horizontal distance x and the amount of inclination θ using the following approximate equation (1).

$$y \approx x \cdot \tan\theta \qquad \text{Approximate equation (1)}$$

The detection unit 152 calculates the amount of positional deviation in the media ejection direction A1 in the physical world between the end position B1 on the lagging side on the trailing end of the medium and the position B2 facing the fifth media sensor 120 based on the resolution of the partial image. The amount of positional deviation in the media ejection direction A1 corresponds to the amount of positional deviation y on the partial image.

Subsequently, the determination unit 153 waits until a part of the trailing end of the conveyed medium passes the position of the fifth media sensor 120 (step S201). The determination unit 153 periodically acquires the fifth media signal from the fifth media sensor 120 and determines that a part of the trailing end of the medium has passed the position of the fifth media sensor 120 when the signal value of the fifth media signal changes from a value indicating the presence of a medium to a value indicating the absence of a medium.

When a part of the trailing end of the medium passes the position of the fifth media sensor 120, the determination unit 153 determines whether the entire trailing end of the medium has passed the imaging position of the imaging device 119 based on the amount of inclination θ of the medium detected by the detection unit 152 (step S202). The determination unit 153 determines whether the entire trailing end of the medium has passed the imaging position of the imaging device 119 by considering the second imaging position P2 of the second imaging sensor 119*d* that is downstream from the first imaging position P1 of the first imaging sensor 119*c* as the imaging position of the imaging device 119. Accordingly, the determination unit 153 can determine whether the entire trailing end of the medium has passed both the imaging position of the first imaging sensor 119*c* and the imaging position of the second imaging sensor 119*d*.

The determination unit 153 determines whether the amount of positional deviation in the media ejection direction A1 detected by the detection unit 152 between the end position B1 on the lagging side on the trailing end of the medium and the position B2 facing the fifth media sensor 120 is less than a predetermined distance L1. The predetermined distance L1 is set to a distance between the position of the fifth media sensor 120 in the media ejection direction A1 and the second imaging position P2 of the second imaging sensor 119*d* that is downstream from the first imaging position P1 of the first imaging sensor 119*c* (see FIG. 3). In other words, the determination unit 153 determines whether the end on the lagging side on the trailing end of the medium passes the second imaging position P2.

When the amount of positional deviation of the trailing end of the medium is less than the predetermined distance L1, the determination unit 153 determines that the entire trailing end of the medium has passed the second imaging position P2 of the second imaging sensor 119*d*, that is, has passed the imaging position of the imaging device 119. By contrast, when the amount of positional deviation of the trailing end of the medium is equal to greater than the predetermined distance L1, the determination unit 153 determines that the entire trailing end of the medium has not passed the second imaging position P2 of the second imaging sensor 119*d*, that is, has not passed the imaging position of the imaging device 119.

In a case where the determination unit 153 determines that the entire trailing end of the medium has passed the imaging position when a part of the trailing end of the medium passes the fifth media sensor 120, the control unit 151 controls the ejection roller to change the rotation speed of the ejection roller (step S203). Even when a change is applied to the movement of a medium after the entire trailing end of the medium passes the imaging position of the imaging device 119, no affection occurs on the medium image obtained by imaging the medium. When the entire trailing end of the medium has passed the imaging position of the imaging device 119, the control unit 151 appropriately changes the rotation speed of the ejection roller, and thus media stacked on the ejection tray 104 are favorably aligned while preventing the occurrence of distortion in a medium image. Accordingly, media are prevented from being scattered in the ejection tray 104. As a result, the user does not have to align the scattered media. Thus, the media ejecting apparatus 100 enhances user convenience.

For example, in a case where the determination unit 153 determines that the entire trailing end of the medium has passed the imaging position of the imaging device 119 when a part of the trailing end of the medium passes the fifth media sensor 120, the control unit 151 reduces the rotation speed of the ejection roller. Accordingly, the control unit 151 can increase a conveyance speed at which a medium is conveyed until the medium is imaged and then reduce the conveyance speed only at the time of ejection. As a result, the control unit 151 can prevent media from being ejected with force and therefore being scattered while reducing the total time of the media reading process.

By contrast, in a case where the determination unit 153 determines that the entire trailing end of the medium has not passed the imaging position when a part of the trailing end of the medium passes the fifth media sensor 120, the control unit 151 controls the ejection roller not to change the rotation speed of the ejection roller (step S204). When a change is applied to the movement of a medium before the entire trailing end of the medium passes the imaging position of the imaging device 119, the medium image obtained by imaging the medium would get affected. When the entire trailing end of the medium has not passed the imaging position of the imaging device 119, the control unit 151 does not change the rotation speeds of the ejection rollers. This prevents the occurrence of distortion in a medium image.

As described above, the control unit 151 controls the first ejection roller 121 and/or the second ejection rollers 122 based on the determination result by the determination unit 153. As a result, the control unit 151 can favorably eject a medium, while favorably imaging the medium.

Subsequently, the control unit 151 waits until the entire trailing end of the medium passes the imaging position of the imaging device 119 (step S205). The control unit 151 determines that the entire trailing end of the medium has passed the imaging position of the imaging device 119 when a second predetermined time has elapsed after the trailing end of the medium passes the position of the fifth media sensor 120. The second predetermined time is set to a time of a margin that takes into consideration the amount of inclination of a medium that the media ejecting apparatus 100 can allow. When the determination unit 153 determines that the entire trailing end of the medium has passed the imaging position of the imaging device 119 in step S202, the control unit 151 determines that the entire trailing end of the medium has already passed the imaging position of the imaging device 119.

Subsequently, the control unit 151 generates a medium image by combining the input images acquired from the imaging device 119 up to the current time and outputs the generated medium image by transmitting the medium image to the information processing apparatus via the interface device 132 (step S206). The medium image is an example of an image based on the input image.

Subsequently, the control unit 151 determines whether a medium remains on the media tray 103 based on the first media signal received from the first media sensor 111 (step S207). When a medium remains on the media tray 103 (S207: YES), the process returns to step S104, and the control unit 151 repeats the operations of step S104 to step S109 and step S201 to step S207.

By contrast, when no media remain on the media tray 103 (S207: NO), the control unit 151 stops the motor 131. Accordingly, the control unit 151 controls the feed roller 112, the separation roller 113, the first conveyance roller 117, the second conveyance roller 118, the first ejection roller 121, and the second ejection roller 122 to stop (step S208). Then, the control unit 151 ends the series of steps.

Alternatively, when neither the leading end nor the trailing end of the medium passes the position of the fourth media sensor 116 or the position of the fifth media sensor 120 after the elapse of a predetermined time elapses from the start of the feeding of the medium, the control unit 151 may determine that the jamming of media has occurred and perform an error operation. As the error operation, the control unit 151 stops the motor 131 to stop the conveyance and ejection of media by the feed roller 112, the separation roller 113, the first conveyance roller 117, the second conveyance roller 118, the first ejection roller 121, and the second ejection roller 122. Further, as the error operation, the control unit 151 may also notify the user of information indicating that the jamming of media has occurred by displaying the information on the display device 106 or transmitting the information to the information processing apparatus via the interface device 132.

As described above in detail, the media ejecting apparatus 100 determines whether the entire trailing end of the medium has passed the imaging position based on the amount of inclination of the medium when a part of the trailing end of the medium passes the predetermined position, and reduces the ejection speed when it is determined that the trailing end of the medium has passed the imaging position. Thus, the media ejecting apparatus 100 can favorably eject a medium while favorably imaging the medium.

Further, the media ejecting apparatus 100 can determine whether to change the ejection speed in a simple manner. This enables the media ejecting apparatus 100 to favorably image and eject a medium while preventing the processing load in the media reading process from increasing. Furthermore, the media ejecting apparatus 100 has a compact housing having the straight path mechanism, and yet can favorably image and eject a medium.

Figure 9:
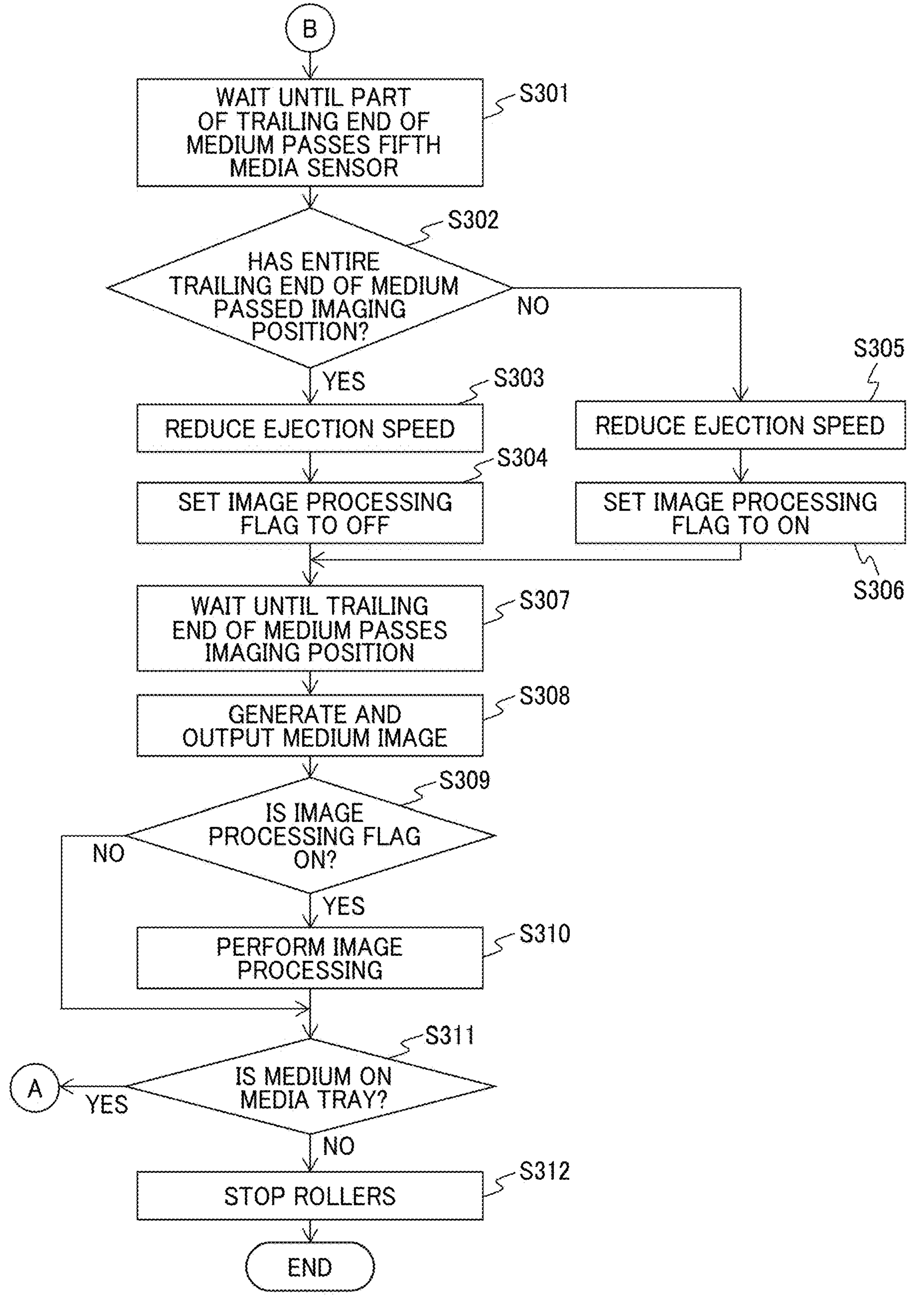
FIG. 9 is a flowchart illustrating an example of a part of another media reading process.

FIG. 9 is a flowchart of a part of a media reading process performed by the media ejecting apparatus 100, according to another embodiment.

The process of flowchart illustrated in FIG. 9 is executed instead of the process of flowchart illustrated in FIG. 7. The operations of steps S301 to S302, S307 to S308, and S311 to S312 of FIG. 9 are performed in the same or substantially the same manner as steps S201 to S202, S205 to S206, and S207 to S208 of FIG. 7. Accordingly, redundant description thereof is omitted below. In the following, the operations of only steps S303 to S306 and S309 to S310 are described.

In a case where the determination unit 153 determines that the entire trailing end of the medium has passed the imaging position when a part of the trailing end of the medium passes the fifth media sensor 120 in step S302, the control unit 151 controls the ejection roller to change the rotation speed of the ejection roller (step S303). The control unit 151 reduces the rotation speed of the ejection roller in the same or substantially the same manner as the operation of step S203.

Subsequently, the control unit 151 sets an image processing flag to OFF (step S304). The image processing flag is a flag indicating whether to perform image processing on the input image.

By contrast, in a case where the determination unit 153 determines that the entire trailing end of the medium has not passed the imaging position when a part of the trailing end of the medium passes the fifth media sensor 120, the control unit 151 controls the ejection roller to change the rotation speed of the ejection roller (step S305). The control unit 151 reduces the rotation speed of the ejection roller in the same or substantially the same manner as the operation of step S303.

Subsequently, the control unit 151 sets the image processing flag to ON (step S306). In step S309, the control unit 151 determines whether the image processing flag is set to ON or OFF (step S309). When the image processing flag is set to OFF, the control unit 151 does not perform any particular processing, and the process proceeds to step S311.

By contrast, when the image processing flag is set to ON, the control unit 151 performs image processing on the medium image (step S310). Accordingly, the control unit 151 can correct the distortion of the medium generated in the medium image while changing the conveyance speed of the medium during the imaging of the medium. Thus, the control unit 151 can appropriately correct the distortion generated in the medium image and obtain a favorable medium image while preventing the occurrence of scattering of media on the ejection tray 104.

The control unit 151 performs thinning processing on the medium image. The control unit 151 performs the thinning processing in the sub-scanning direction on an area imaged after the speed change in the medium image using known interpolation processing such as nearest neighbor interpolation, bilinear interpolation, or bicubic interpolation. Since the conveyance speed of the medium is reduced in step S305, the interval between positions in the medium image imaged by the imaging device 119 becomes shorter. As a result, the medium is imaged with being elongated in the vertical direction (sub-scanning direction). The control unit 151 performs the thinning processing such that the number of pixels in the sub-scanning direction of the area imaged after the speed change in the medium image matches the number of pixels in the sub-scanning direction when the speed is not changed. Accordingly, the control unit 151 can appropriately correct the elongation occurred in the medium image and obtain a favorable medium image.

As described above, in a case where the determination unit 153 determines that the entire trailing end of the medium has not passed the imaging position when a part of the trailing end of the medium passes the fifth media sensor 120, the control unit 151 controls the ejection roller to change the rotation speed of the ejection roller and performs image processing on the medium image. In a case where the determination unit 153 determines that the entire trailing end of the medium has not passed the imaging position when a part of the trailing end of the medium passes the fifth media sensor 120, the control unit 151 reduces the rotation speed of the ejection roller and performs thinning processing on the medium image. As a result, the control unit 151 can favorably eject a medium while favorably imaging the medium even when the medium is conveyed as being inclined.

Figure 10:
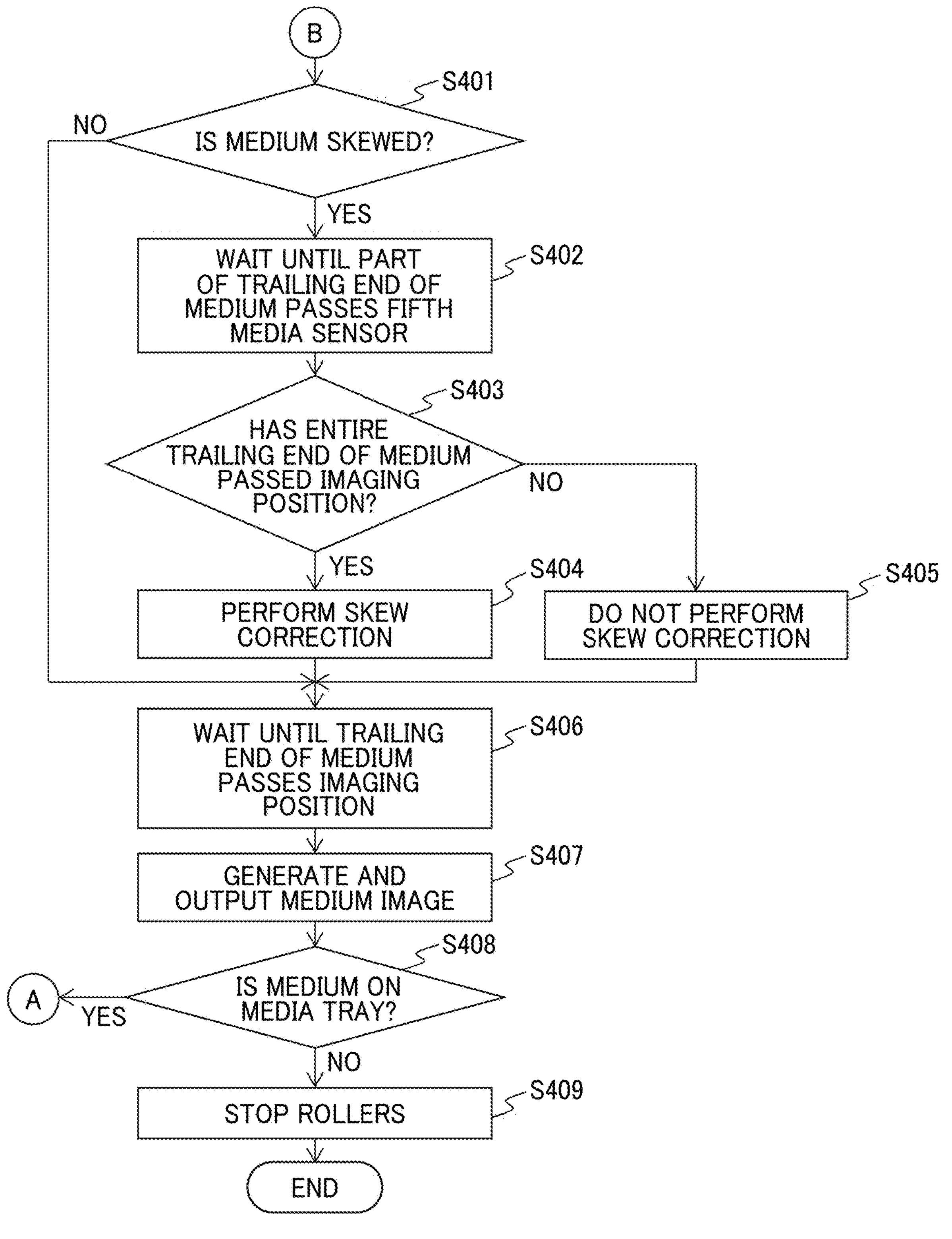
FIG. 10 is a flowchart illustrating an example of a part of another media reading process.

As described above in detail, the media ejecting apparatus 100 can favorably eject a medium while favorably imaging the medium even when the rotation speed of the ejection roller is reduced while the entire trailing end of the medium has not passed the imaging position. FIG. 10 is a flowchart of a part of a media reading process performed by the media ejecting apparatus 100, according to still another embodiment.

The process of flowchart illustrated in FIG. 10 is executed instead of the process of flowchart illustrated in FIG. 7. The operations of steps S402 to S403 and S406 to S409 of FIG. 10 are performed in the same or substantially the same manner as steps S201 to S202 and S205 to S208 of FIG. 7. Accordingly, redundant description thereof is omitted below. In the following, the operations of only steps S401 and S404 to S405 are described.

In the present embodiment, the first ejection rollers 121 includes multiple first ejection rollers 121 and the second ejection roller 122 includes multiple second ejection rollers 122. The first ejection rollers 121 are disposed at intervals in the width direction A2. The second ejection rollers 122 are disposed at intervals in the width direction A2. The first ejection rollers 121 and/or the second ejection rollers 122 are provided so as to rotate independently to eject a medium. For example, the first ejection rollers 121 and/or the second ejection rollers 122 are provided so as to be driven by different motors, respectively.

In step S401, the skew determination unit 154 determines whether skew of a medium has occurred based on the amount of inclination θ of the medium detected by the detection unit 152 (step S401). For example, the skew determination unit 154 determines that the skew of the medium has occurred when the amount of inclination θ is equal to or greater than an inclination threshold value, and determines that the skew of the medium has not occurred when the amount of inclination θ is less than the inclination threshold value. The inclination threshold value is set in advance by preliminary experiments to a minimum value (e.g., 3°) of the amount of inclination at which the jamming of a medium occurs if the inclination of the medium is not corrected.

When the skew determination unit 154 determines that no skew of the medium has occurred, the skew determination unit 154 does not perform the operations of steps S402 to S405, and the process proceeds to step S406. By contrast, when the skew determination unit 154 determines that the skew of the medium has occurred, the process proceeds to step S402.

In a case where the determination unit 153 determines that the entire trailing end of the medium has passed the imaging position when a part of the trailing end of the medium passes the fifth media sensor 120 in step S403, the control unit 151 controls the ejection rollers to change the rotation speed of the ejection roller (step S404). The control unit 151 controls the ejection rollers to correct skew (inclination) of the medium. The control unit 151 corrects the inclination of the medium to be ejected by differentiating the circumferential speed of each of the first ejection rollers 121 and/or differentiating the circumferential speed of each of the second ejection rollers 122. The control unit 151 sets the circumferential speeds such that the circumferential speed of the ejection roller positioned on the lagging side of the medium is higher than the circumferential speed of the ejection roller positioned on the leading side of the medium.

Figure 11:
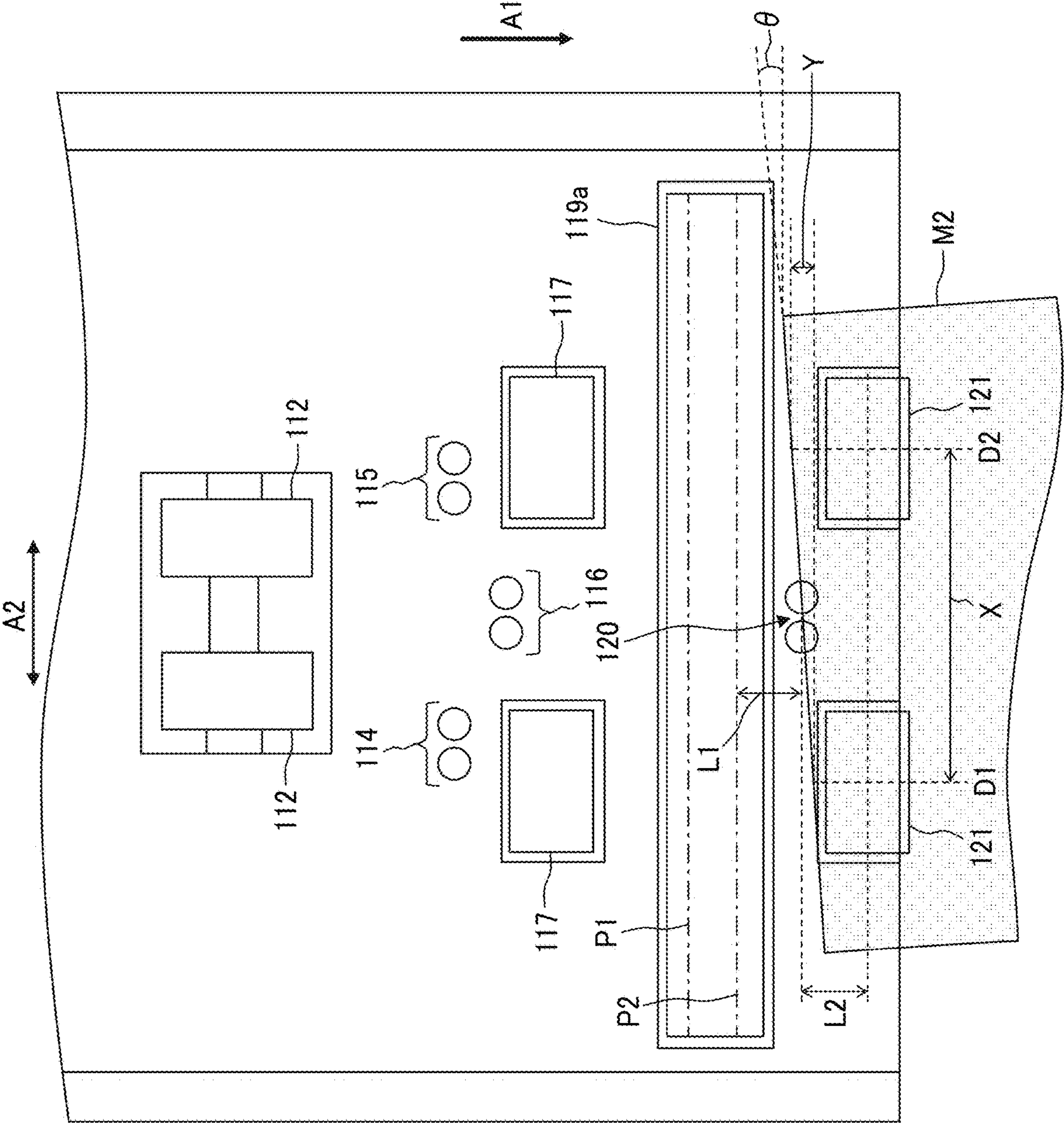
FIG. 11 is a schematic diagram for describing the correction of skew of a medium.

FIG. 11 is a schematic diagram for describing the correction of skew of a medium. FIG. 11 is a schematic view of the lower housing 101 as viewed from the conveyance passage in a state where a medium M2 is conveyed as being inclined.

In the example illustrated in FIG. 11, the medium M2 is inclined in a manner that the left end of the trailing end is leading and the right end of the trailing end is lagging. In this case, the control unit 151 sets the circumferential speeds such that the circumferential speed of the first ejection roller 121 on the right side is higher than the circumferential speed of the first ejection roller 121 on the left side.

For example, the control unit 151 sets the circumferential speed of the ejection roller on the lagging side to a speed higher (faster) than a reference speed and sets the circumferential speed of the ejection roller positioned on the leading side to the reference speed. Alternatively, the control unit 151 may set the circumferential speed of the ejection roller on the lagging side to the reference speed and set the circumferential speed of the ejection roller positioned on the leading side to a speed lower (slower) than the reference speed. Still alternatively, the control unit 151 may set the circumferential speed of the ejection roller on the lagging side to a speed higher (faster) than the reference speed and set the circumferential speed of the ejection roller positioned on the leading side to a speed lower (slower) than the reference speed. As a result, the medium rotates around the ejection roller positioned on the leading side, and thus the skew of the medium is eliminated. Further, the control unit 151 returns the circumferential speeds of the ejection rollers to the reference speed after a predetermined time elapses from the start of the correction of skew of the medium.

As illustrated in FIG. 11, when the medium M2 is conveyed in an inclined manner, an amount of positional deviation Y of the trailing end of the medium M2 in the media ejection direction A1 at center positions D1 and D2 of the two ejection rollers in the width direction A2 is calculated using the following equation (2).

$$Y = X \cdot \tan\theta \qquad \text{Equation (2)}$$

X is a distance between the center position D1 of one ejection roller and the center position D2 of the other ejection roller in the width direction A2. θ is an inclination angle (amount of inclination) of the trailing end of the medium M2.

In order to have the trailing end on the lagging side of the medium reach the center position of the ejection roller on the lagging side in the media ejection direction A1 after a predetermined time t, a circumferential speed v1 of the ejection roller on the lagging side has to be set as in the following equation (3).

$$v1 = (L2 + Y/2)/t \qquad \text{Equation (3)}$$

L2 is a distance between the fifth media sensor 120 and the center position of the ejection roller in the media ejection direction A1.

On the other hand, in order to have the trailing end on the leading side of the medium to reach the center position of the ejection roller on the leading side in the media ejection direction A1 after the predetermined time t, a circumferential speed v2 of the ejection roller on the side conveyed faster has to be set as in the following equation (4).

$$v2 = (L2 - Y/2)/t \qquad \text{Equation (4)}$$

Accordingly, the media ejecting apparatus 100 can appropriately correct the skew of the medium by setting the peripheral speed v1 of the ejection roller on the lagging side and the peripheral speed v2 of the ejection roller on the leading side so as to satisfy the following equation (5).

$$v2/v1 = (L2 - Y/2)/(L2 + Y/2) \qquad \text{Equation (5)}$$

By contrast, in a case where the determination unit 153 determines that the entire trailing end of the medium has passed the imaging position when a part of the trailing end of the medium passes the fifth media sensor 120, the control unit 151 does not correct the skew of the medium (step S405).

In other words, in a case where the determination unit 153 determines that the entire trailing end of the medium has passed the imaging position when a part of the trailing end of the medium passes the fifth media sensor 120 in a state where the skew determination unit 154 determines that the skew of the medium has occurred, the control unit 151 controls the ejection roller to correct the skew of the medium. By contrast, in a case where the determination unit 153 determines that the entire trailing end of the medium has not passed the imaging position when a part of the trailing end of the medium passes the fifth media sensor 120 in a state where the skew determination unit 154 determines that the skew of the medium has occurred, the control unit 151 does not correct the skew of the medium. As a result, the control unit 151 can favorably eject a medium while favorably imaging the medium even when the medium is conveyed as being inclined.

Alternatively, in a case where the determination unit 153 determines that the entire trailing end of the medium has passed the imaging position when a part of the trailing end of the medium passes the fifth media sensor 120, the control unit 151 may reduce the rotation speed of the ejection roller in addition to correcting the skew of the medium. In this case, in step S404, the control unit 151 completes the correction of the skew of the medium before the trailing end of the medium reaches a center position of the ejection roller in the media ejection direction A1 and then reduces the rotation speed of the ejection roller. For example, the control unit 151 corrects the skew of the medium before the trailing end of the medium reaches a center position, thus, while the trailing end of the medium is between the fifth media sensor 120 and the center position of the ejection roller in the media ejection direction A1, and then reduces the rotation speed of the ejection roller. In this case, the circumferential speed v1 of the ejection roller on the lagging side of the medium and the circumferential speed v2 of the ejection roller on the leading side of have to be set as in the following equations (6) and (7) instead of the above equations (3) and (4).

$$v1 = (L2/2 + Y/2)/t \quad \text{Equation (6)}$$

$$v2 = (L2/2 - Y/2)/t \quad \text{Equation (7)}$$

Accordingly, the circumferential speed v1 of the ejection roller on the lagging side of the medium and the circumferential speed v2 of the ejection roller on the leading side of the medium are set to satisfy the following equation (8) instead of the above equation (5).

$$v2/v1 = (L2 - Y)/(L2 + Y) \quad \text{Equation (8)}$$

Still alternatively, the skew determination unit 154 may determine that no skew of the medium has occurred when the amount of positional deviation Y is less than the distance L1 between the position of the fifth media sensor 120 and the second imaging position P2 of the second imaging sensor 119*d*. The control unit 151 does not correct the skew of the medium when the amount of positional deviation Y is less than the distance L1.

Still alternatively, in a case where the determination unit 153 determines that the entire trailing end of the medium has not passed the imaging position when a part of the trailing end of the medium passes the fifth media sensor 120 in a state where the skew determination unit 154 determines that the skew of the medium has occurred, the control unit 151 may correct the skew of the medium and perform image processing on the medium image. In this case, in step S404, the control unit 151 sets the image processing flag to ON. Or, in step S405, the control unit 151 sets the image processing flag to ON while correcting the skew of the medium in the same or substantially the same manner as the processing in step S404. In step S407, when the image processing flag is set to ON, the control unit 151 performs image processing on the medium image. The control unit 151 performs conversion processing on an area image in the medium image imaged after the speed change using a known image processing technology such that the medium included in the medium image is rectangular.

As described above in detail, the media ejecting apparatus 100 performs the correction of skew when the entire trailing end of the medium has passed through the imaging position when a part of the trailing end of the medium passes the predetermined position. Thus, the media ejecting apparatus 100 can favorably eject a medium while favorably imaging the medium also in this case.

Figure 12:
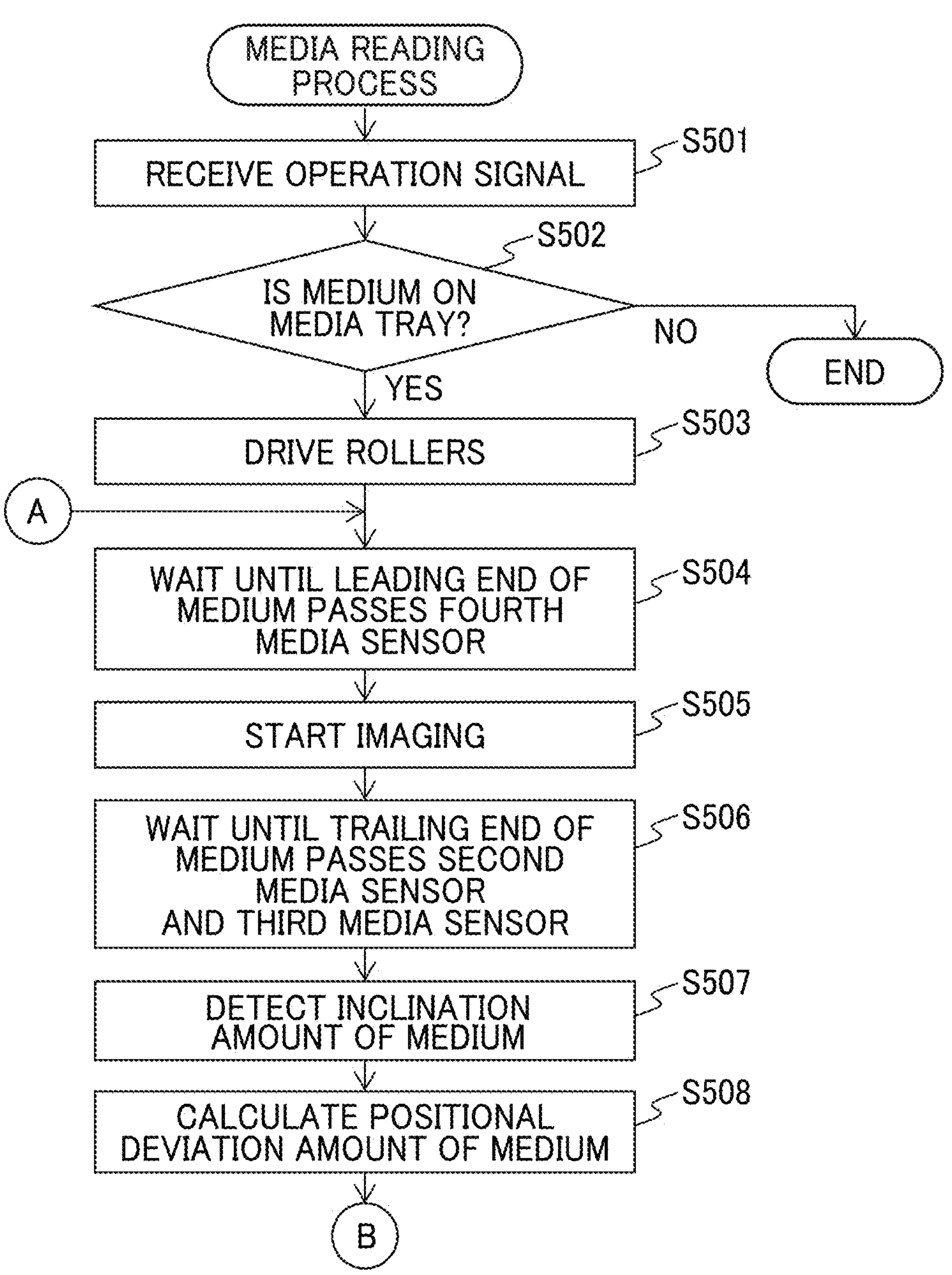
FIG. 12 is a flowchart illustrating an example of a part of another media reading process.

FIG. 12 is a flowchart of a part of a media reading process performed by the media ejecting apparatus 100, according to still another embodiment.

The process of flowchart illustrated in FIG. 12 is executed instead of the process of flowchart illustrated in FIG. 6. The operations of steps S501 to S505 of FIG. 12 are performed in the same or substantially the same manner as steps S101 to S105 of FIG. 6. Accordingly, redundant description thereof is omitted below. In the following, the operations of only steps S506 to S508 are described.

In step S506, the control unit 151 waits until the trailing end of the conveyed medium passes both the position of the second media sensor 114 and the position of the third media sensor 115 (step S506). The control unit 151 periodically acquires the second media signal from the second media sensor 114 and determines that the trailing end of the medium has passed the position of the second media sensor 114 when the signal value of the second media signal changes from a value indicating the presence of a medium to a value indicating the absence of a medium. Similarly, the control unit 151 periodically acquires the third media signal from the third media sensor 115 and determines that the trailing end of the medium has passed the position of the third media sensor 115 when the signal value of the third media signal changes from a value indicating the presence of a medium to a value indicating the absence of a medium.

Subsequently, the detection unit 152 detects the amount of inclination θ of the medium based on the timing when the trailing end of the conveyed medium passes the position of the second media sensor 114 and the timing when the trailing end of the conveyed medium passes the position of the third media sensor 115 (step S507). The detection unit 152 calculates the amount of inclination θ of the medium using the following equation (9).

$$\theta = \tan^{-1}(Y2/W) \quad \text{Equation (9)}$$

Y2 is a distance that the trailing end of the medium moves from one of the position of the second media sensor 114 and the third media sensor 115 to the other one of the position of the second media sensor 114 and the third media sensor 115. The distance Y2 is calculated by multiplying a time elapsed from when the trailing end of the medium passes one of the position of the second media sensor 114 and the third media sensor 115 until when the trailing end passes the other one of the position of the second media sensor 114 and the third media sensor 115 by the conveyance speed of the medium. W is a distance between the second media sensor 114 and the third media sensor 115 in the width direction A2.

As described above, the detection unit 152 detects the amount of inclination θ of the medium based on the second media signal from the second media sensor 114 and the third media signal from the third media sensor 115. The detection unit 152 can detect the amount of inclination of the medium earlier by using the second media sensor 114 and the third media sensor 115 that are disposed upstream from the imaging device 119.

Subsequently, the detection unit 152 estimates an amount of positional deviation in the media ejection direction A1 between the end position B1 on the lagging side on the trailing end of the medium and the position B2 facing the fifth media sensor 120 on the trailing end (step S508).

The detection unit 152 identifies a lagging side from the left end and the right end of the medium based on the timing when the trailing end of the medium passes the position of the second media sensor 114 and the timing when the trailing end of the medium passes the position of the third media sensor 115. The detection unit 152 calculates the adjacent difference values from the identified lagging end side in the latest input image, and detects a pixel of which the adjacent difference value exceeds the gradation threshold for the first time as an end edge pixel corresponding to the identified end.

The detection unit 152 calculates a horizontal distance between the detected end edge pixel and a pixel corresponding to the fifth media sensor 120 in the input image. The position of the pixel corresponding to the fifth media sensor 120 in the horizontal direction in the partial image is set in advance based on the positional relationship between the first imaging position P1 of the first imaging sensor 119*c* and the position of the fifth media sensor 120. The detection unit 152 calculates a distance x' in the width direction A2 in the physical world between an end position on the lagging side on the trailing end of the medium and a position facing the fifth media sensor 120, based on the resolution of the input image. The distance x' in the width direction A2 corresponds to the horizontal distance on the input image. Subsequently, the detection unit 152 calculates (estimates) an amount of positional deviation y in the vertical direction on the partial image between the end position B1 on the lagging side on the trailing end of the medium and the position B2 facing the fifth media sensor 120 based on the distance x' and the amount of inclination θ using the following approximate equation (10).

$$Y' \approx x' \cdot \tan\theta \qquad \text{Approximate equation (10):}$$

Alternatively, the media ejecting apparatus 100 may include a large number of media sensors disposed along the width direction A2 and identify an end in the width direction A2 of the trailing end of the conveyed medium based on media detection signals from the media sensors. Still alternatively, in a case where a medium of the maximum size supported by the media ejecting apparatus 100 is conveyed without being inclined, the media ejecting apparatus 100 may identify a position where the end in the width direction A2 of the medium passes as the end of the trailing end in the width direction A2 of the conveyed medium.

As described above in detail, the media ejecting apparatus 100 can favorably eject a medium while favorably imaging the medium also in a case where the media ejecting apparatus 100 detects the amount of inclination of the medium based on the second media signal from the second media sensor 114 and the third media signal from the third media sensor 115.

Figure 13:
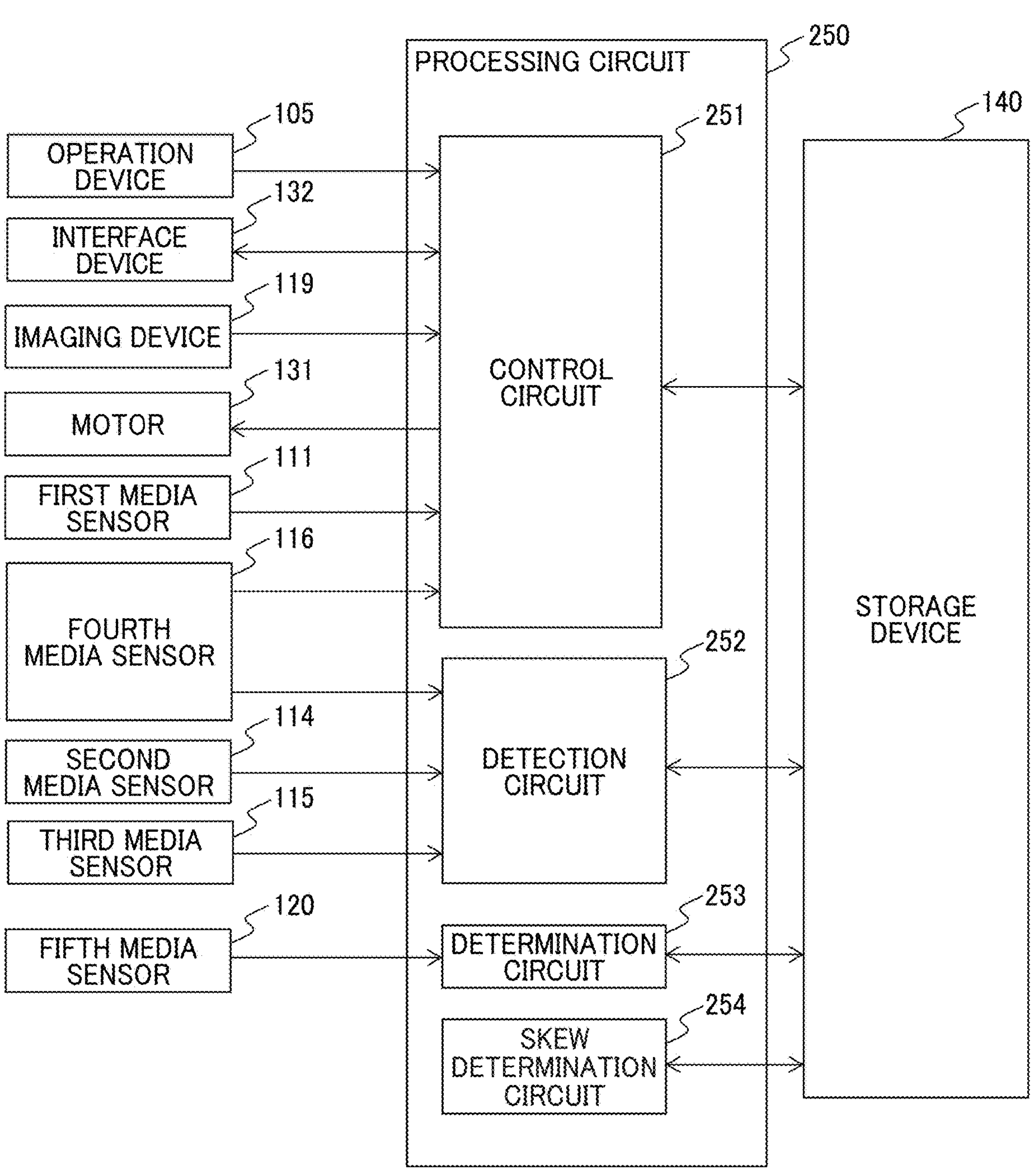
FIG. 13 is a schematic diagram illustrating a configuration of another processing circuit.

FIG. 13 is a schematic diagram illustrating a configuration of a processing circuit 250 of a media ejecting apparatus according to another embodiment. The processing circuit 250 substitutes for the processing circuit 150 of the media ejecting apparatus 100 and performs, for example, the media reading process instead of the processing circuit 150. The processing circuit 250 includes a control circuit 251, a detection circuit 252, a determination circuit 253, and a skew determination circuit 254. These circuits may be implemented by, for example, independent integrated circuits, microprocessors, or firmware.

The control circuit 251 is an example of a control unit and functions in the same or substantially the same manner as the control unit 151. The control circuit 251 receives the operation signal from the operation device 105 or the interface device 132, the first media signal from the first media sensor 111, and the fourth media signal from the fourth media sensor 116. The control circuit 251 controls the motor 131 on the basis the received information. The control circuit 251 acquires the input image from the imaging device 119 and stores the acquired input image in the storage device 140. The control circuit 251 generates the partial image based on the input image and stores the partial image in the storage device 140. The control circuit 251 generates the medium image based on the input image and outputs the media image to the interface device 132. Further, the control circuit 251 reads the determination result of whether the entire trailing end of a medium has passed the imaging position and/or the determination result of the skew of the medium from the storage device 140. The control circuit 251 controls the motor 131 to control the ejection roller based on the read determination result.

The detection circuit 252 is an example of a detection unit and functions in the same or substantially the same manner as the detection unit 152. The detection circuit 252 receives the second media signal from the second media sensor 114, the third media signal from the third media sensor 115, and the fourth media signal from the fourth media sensor 116. The detection circuit 252 reads the partial image or the input image from the storage device 140. The detection circuit 252 detects the amount of inclination of the medium and the amount of positional deviation based on the acquired information, and stores the detection results in the storage device 140.

The determination circuit 253 is an example of a determination unit and functions in the same or substantially the same manner as the determination unit 153. The determination circuit 253 receives the fifth media signal from the fifth media sensor 120, and reads the detection result of the amount of inclination of the medium and the detection result of the amount of positional deviation from the storage device 140. The determination circuit 253 determines whether the entire trailing end of the medium has passed the imaging position based on the acquired information, and stores the determination result in the storage device 140.

The skew determination circuit 254 is an example of a skew determination unit and functions in the same or substantially the same manner as the skew determination unit 154. The skew determination circuit 254 reads the detection result of the amount of inclination of the medium and the detection result of the amount of positional deviation from the storage device 140, determines whether the skew of the medium occurs based on the detection results that are read, and stores the determination result in the storage device 140.

As described above in detail, the media ejecting apparatus using the processing circuit 250 can favorably eject a medium while favorably imaging the medium.

A media ejecting apparatus is required to favorably eject a medium while favorably imaging the medium.

According to one or more embodiments, a media ejecting apparatus, a control method, and a control program can favorably eject medium while favorably imaging the media.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. A media ejecting apparatus, comprising:

an imaging device to image a medium to generate an input image;

an ejection roller located downstream from the imaging device in a media ejection direction to eject the medium imaged by the imaging device;

a sensor located between the imaging device and the ejection roller to detect a part of a trailing end of the medium; and circuitry configured to:

detect an amount of inclination of the medium;

determine whether an entire trailing end of the medium has passed an imaging position of the imaging device based on the amount of inclination when a part of the trailing end of the medium passes the sensor and generate a determination result; and control the ejection roller based on the determination result.

2. The media ejecting apparatus of claim 1, wherein the circuitry is configured to control the ejection roller to change a rotation speed of the ejection roller in response to the determination result indicating that the entire trailing end of the medium has passed the imaging position when a part of the trailing end of the medium passes the sensor.

3. The media ejecting apparatus of claim 1, wherein the circuitry is configured to control the ejection roller not to change a rotation speed of the ejection roller in response to the determination result indicating that the entire trailing end of the medium has not passed the imaging position when a part of the trailing end of the medium passes the sensor.

4. The media ejecting apparatus of claim 1, wherein the circuitry is configured to perform image processing on an image based on the input image while controlling the ejection roller to change a rotation speed of the ejection roller in response to the determination result indicating that the entire trailing end of the medium has not passed the imaging position when a part of the trailing end of the medium passes the sensor.

5. The media ejecting apparatus of claim 1, wherein the circuitry is configured to:

control the ejection roller to reduce a rotation speed of the ejection roller in response to the determination result indicating that the entire trailing end of the medium has passed the imaging position when a part of the trailing end of the medium passes the sensor; and control the ejection roller not to change the rotation speed of the ejection roller in response to the determination result indicating that the entire trailing end of the medium has not passed the imaging position when a part of the trailing end of the medium passes the sensor.

6. The media ejecting apparatus of claim 1, wherein the circuitry is configured to:

control the ejection roller to reduce a rotation speed of the ejection roller in response to the determination result indicating that the entire trailing end of the medium has passed the imaging position when a part of the trailing end of the medium passes the sensor; and perform thinning processing on an image based on the input image while controlling the ejection roller to reduce the rotation speed of the ejection roller in response to the determination result indicating that the entire trailing end of the medium has not passed the imaging position when a part of the trailing end of the medium passes the sensor.

7. The media ejecting apparatus of claim 1, wherein, a plurality of ejection rollers are located at intervals in a direction orthogonal to the media ejection direction, the circuitry is further configured to:

determine whether skew of the medium has occurred; and in a case where the circuitry determines that the skew of the medium has occurred, control an ejection roller of said plurality of ejection rollers to perform a skew correction on the medium in response to the determination result indicating that the entire trailing end of the medium has passed the imaging position when a part of the trailing end of the medium passes the sensor; and control the ejection roller of said plurality of ejection rollers not to perform the skew correction on the medium in response to the determination result indicating that the entire trailing end of the medium has not passed the imaging position when a part of the trailing end of the medium passes the sensor.

8. The media ejecting apparatus of claim 1, wherein the imaging device includes a first imaging sensor for imaging a first side of the medium at a first position and a second imaging sensor for imaging a second side of the medium at a second position downstream from the first position in the media ejection direction, and the circuitry is configured to:

determine whether the entire trailing end of the medium has passed the second position as the imaging position; and detect the amount of inclination based on the image imaged by the first imaging sensor.

9. The media ejecting apparatus of claim 1, further comprising a plurality of another sensors located upstream from the imaging device in the media ejection direction at intervals in a direction orthogonal to the media ejection direction to detect the trailing end of the medium, wherein the circuitry is configured to detect the amount of inclination based on output signals from the plurality of another sensors.

10. A method of controlling a media ejecting apparatus, the method comprising:

imaging a medium by an imaging device to generate an input image;

ejecting the medium imaged by the imaging device by an ejection roller located downstream from the imaging device in a media ejection direction;

detecting a part of a trailing end of the medium by a sensor located between the imaging device and the ejection roller;

detecting an amount of inclination of the medium;

determining whether an entire trailing end of the medium has passed an imaging position of the imaging device based on the amount of inclination when a part of the trailing end of the medium passes the sensor and generating a determination result; and controlling the ejection roller based on the determination result.

11. A non-transitory computer-executable medium storing a plurality of instructions which, when executed by one or more processors, causes the one or more processors to perform a method, the method comprising:

detecting an amount of inclination of a medium;

determining whether an entire trailing end of the medium has passed an imaging position of an imaging device based on the amount of inclination when a part of the trailing end of the medium passes a sensor located between the imaging device and the ejection roller and generating a determination result; and controlling an ejection roller based on the determination result.

* * * * *